(12) United States Patent
Johnson et al.

(10) Patent No.: US 9,701,329 B2
(45) Date of Patent: Jul. 11, 2017

(54) CART PUSHER, MATEABLE CARTS, AND RELATED SYSTEMS, METHODS, AND DEVICES

(71) Applicant: Dane Technologies, INC., Brooklyn Park, MN (US)

(72) Inventors: Dan Johnson, Medina, MN (US); Andrew Dvorak, Minnetonka, MN (US)

( * ) Notice: Subject to any disclaimer, the term of this patent is extended or adjusted under 35 U.S.C. 154(b) by 0 days.

(21) Appl. No.: 15/003,439

(22) Filed: Jan. 21, 2016

(65) Prior Publication Data

US 2016/0207554 A1   Jul. 21, 2016

Related U.S. Application Data

(60) Provisional application No. 62/106,082, filed on Jan. 21, 2015, provisional application No. 62/127,657, filed on Mar. 3, 2015.

(51) Int. Cl.
| | |
|---|---|
| *B62B 3/00* | (2006.01) |
| *B62B 5/00* | (2006.01) |
| *B62B 3/04* | (2006.01) |
| *B62B 3/14* | (2006.01) |
| *B62B 5/06* | (2006.01) |

(52) U.S. Cl.
CPC ............. *B62B 3/008* (2013.01); *B62B 3/04* (2013.01); *B62B 3/1404* (2013.01); *B62B 5/0046* (2013.01); *B62B 5/0079* (2013.01); *B62B 5/067* (2013.01); *B62B 2203/073* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,924,287 | A | * | 2/1960 | Bramley ............... B62D 51/005 180/19.3 |
| 3,876,024 | A | * | 4/1975 | Shieman .............. B62D 51/005 180/19.1 |
| 4,645,264 | A | * | 2/1987 | Morrison ................. B60P 1/16 165/41 |
| RE33,131 | E | * | 12/1989 | Morrison ................. B60P 1/16 165/41 |
| 5,284,218 | A | * | 2/1994 | Rusher, Jr. ................ B62B 3/04 180/19.1 |
| 5,322,306 | A | * | 6/1994 | Coleman .............. B62B 3/1404 180/19.1 |
| 5,348,326 | A | * | 9/1994 | Fullenkamp ............ A61G 7/00 280/43 |
| 6,405,515 | B1 | * | 6/2002 | Wright ................ A01D 34/001 56/14.7 |

(Continued)

FOREIGN PATENT DOCUMENTS

DE    202013103255    8/2013

*Primary Examiner* — Erez Gurari
(74) *Attorney, Agent, or Firm* — Davis, Brown, Koehn, Shors & Roberts, P.C.; Sean D. Solberg

(57) ABSTRACT

Various embodiments herein relate to powered pusher devices configured to push wheeled objects from one location to another. Further embodiments relate to wheeled objects such as carts for transporting items from one location to another. Other embodiments relate to platform powered pushers that can be coupled to a family of various wheeled objects.

20 Claims, 26 Drawing Sheets

(56) References Cited

U.S. PATENT DOCUMENTS

| | | | | |
|---|---|---|---|---|
| 7,270,201 B1* | 9/2007 | Cryer | ............... | B60S 13/00 |
| | | | | 180/19.2 |
| 7,594,284 B2* | 9/2009 | Schuchardt | ............ | B62B 3/0612 |
| | | | | 254/10 R |
| 7,849,943 B1* | 12/2010 | Ragland | ............... | B60S 13/00 |
| | | | | 180/19.2 |
| 8,127,870 B2* | 3/2012 | March | ............... | A61G 5/02 |
| | | | | 180/19.1 |
| 8,360,459 B2* | 1/2013 | Holtan | ............... | B60D 1/02 |
| | | | | 280/458 |
| 8,684,373 B2* | 4/2014 | Holtan | ............... | B62B 3/1404 |
| | | | | 280/33.991 |
| 9,205,882 B1* | 12/2015 | Hoffman | ............ | B62D 51/001 |
| 2004/0200646 A1 | 10/2004 | Waters et al. | | |
| 2005/0040614 A1 | 2/2005 | Johnson et al. | | |
| 2007/0210542 A1* | 9/2007 | Hammond | ............ | B62B 3/008 |
| | | | | 280/43.12 |
| 2011/0168464 A1 | 7/2011 | Scheuerman et al. | | |
| 2016/0207554 A1* | 7/2016 | Johnson | ............... | B62B 3/02 |

* cited by examiner

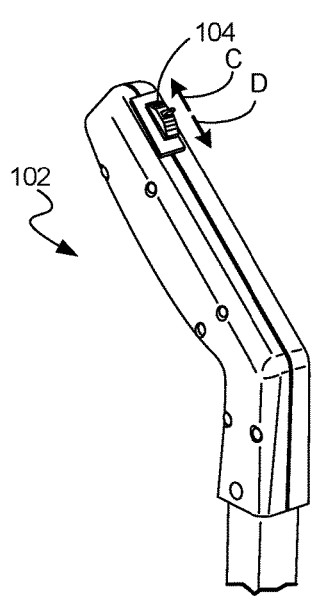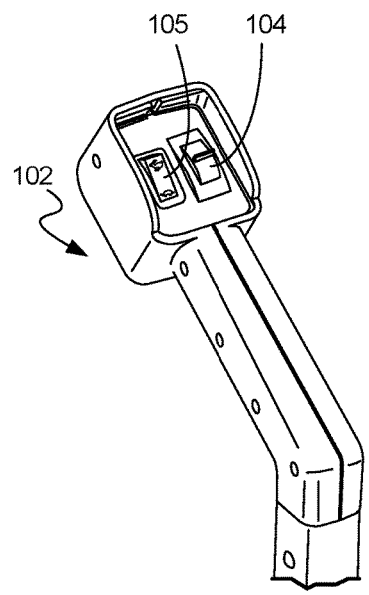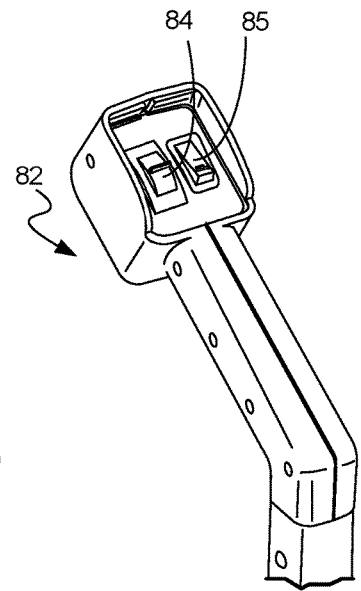
Fig. 7A  Fig. 7B  Fig. 7C
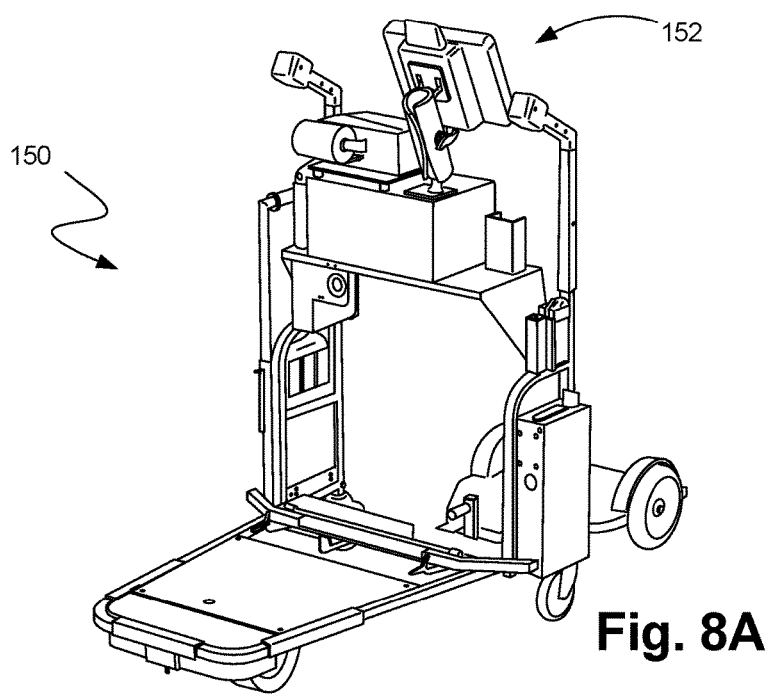
Fig. 8A

CART PUSHER, MATEABLE CARTS, AND RELATED SYSTEMS, METHODS, AND DEVICES

CROSS-REFERENCE TO RELATED APPLICATION(S)

This application claims priority to U.S. Provisional Patent Application 62/106,082, filed Jan. 21, 2015 and entitled "Cart Pusher," and further claims priority to U.S. Provisional Patent Application 62/127,657, filed Mar. 3, 2015 and entitled "Cart Pusher, Mateable Carts, and Related Systems, Methods, and Devices," both of which are hereby incorporated herein by reference in their entireties.

FIELD OF THE INVENTION

Various embodiments disclosed herein relate to powered pushing systems and devices for pushing carts and other wheeled objects. Other embodiments relate to carts, including flatbed carts and shelf carts that can be moved around manually or with the assistance of a powered pusher. Further embodiments relate to self-propelled carts.

BACKGROUND OF THE INVENTION

Carts and other wheeled objects have been used in retail, warehouse, and other environments in significant volume for years. In those situations in which a large number of carts need to be moved from one location to another or when a user (such as a customer or warehouse employee) wants to collect and/or move products or other items, a powered cart pusher can be necessary or at least very helpful. In addition, as the carts become more popular and new uses and specific needs develop, the carts have become more sophisticated and/or specifically designed to accommodate certain items and/or operate in certain environments.

There is a need in the art for improved pushing devices and carts.

BRIEF SUMMARY OF THE INVENTION

Discussed herein are various powered pusher embodiments, along with various wheeled object embodiments.

In Example 1, a powered pushing device comprises a base, a base bar defining an outer perimeter of the base, a left control handle coupled to a left portion of the base bar, a right control handle coupled to a right portion of the base bar, a pair of rear swivel wheels, a pair of front fixed wheels disposed under the base, and a motor operably coupled to the pair of front fixed wheels. The fixed front wheels are disposed proximally from a front end of the base.

Example 2 relates to the powered pushing device according to Example 1, wherein a distance between the pair of rear swivel wheels is greater than the distance between the pair of front fixed wheels.

Example 3 relates to the powered pushing device according to Example 1, wherein the base is a flatbed base.

Example 4 relates to the powered pushing device according to Example 2, wherein the flatbed base has a maximum height of about 7.5 inches.

Example 5 relates to the powered pushing device according to Example 1, wherein a distance between the left control handle and the right control handle is at least as great as a width of the base.

Example 6 relates to the powered pushing device according to Example 5, wherein the left control handle and the right control handle define a space between the left and right control handles.

Example 7 relates to the powered pushing device according to Example 1, further comprising a latching component configured to be coupleable to a wheeled object, wherein the latching component is disposed at a proximal location on the base.

In Example 8, a wheeled cart comprises a base, four swivel wheels, a guide wheel assembly disposed at a substantially central location beneath the base and moveable coupled to the base, and a manual deployment assembly coupled to the base. Each swivel wheel is disposed at a corner of the base. The guide wheel assembly comprises an assembly frame, wherein the assembly frame is configured to move between a deployed position and a retracted position, a deployment plate coupled to the frame, and two guide wheels rotatably coupled to the frame. The manual deployment assembly comprises first and second deployment levers operably coupled to a rod, wherein actuation of either of the first and second deployment levers causes the guide wheel assembly to move between the deployed and retracted positions.

Example 9 relates to the wheeled cart according to Example 8, wherein the deployment plate is configured to be moveable by a powered pusher when the powered pusher is positioned under the base such that the powered pusher makes contact with the deployment plate.

Example 10 relates to the wheeled cart according to Example 9, wherein the powered pusher contacting the deployment plate causes the assembly frame to move toward the retracted position.

Example 11 relates to the wheeled cart according to Example 8, wherein the guide wheel assembly further comprises at least two slot bolts extending from the assembly frame, and a tensioned component coupled to the assembly frame and the base, wherein the tensioned component is configured to urge the assembly frame away from the base.

Example 12 relates to the wheeled cart according to Example 11, further comprising at least two brackets coupled to the base, wherein each of the at least two brackets comprise a slot configured to receive the at least two slot bolts, wherein each of the at least two slot bolts are slidably positioned within the slot.

Example 13 relates to the wheeled cart according to Example 8, wherein the manual deployment assembly further comprises first and second lift arms operably coupled to the rod, wherein the lift arms are configured to be coupled to the guide wheel assembly.

Example 14 relates to the wheeled cart according to Example 13, wherein actuation of either of the first and second deployment levers causes the rod to rotate, which causes the first and second lift arms to move between a lowered position and a raised position, which causes the guide wheel assembly to move between the deployed and retracted positions, respectively.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 7A is a perspective view of a control handle grip, according to one embodiment.

FIG. 7B is a perspective view of a left control handle grip, according to one embodiment.

FIG. 7C is a perspective view of a right control handle grip, according to one embodiment.

FIG. 8A is a front perspective view of a pusher, according to another embodiment.

DETAILED DESCRIPTION

Certain embodiments disclosed herein relate to powered pushers for use in interchangeably coupling with and pushing various types of carts and other wheeled devices, including stackable wheeled devices, such as flatbed carts, wheelchairs, etc. Other embodiments relate to carts, including some pushable carts that can be coupled to certain of the powered pushers disclosed herein. Further implementations relate to systems including at least one powered pusher and various different carts and other wheeled objects—such as a family of such carts and/or devices—that can interchangeably couple with and be pushed by the powered pusher.

Certain implementations relate to a powered pusher—including, for example, a battery-powered pusher—that connects to wheeled devices. For example, some pusher embodiments can connect to certain wheeled carts by sliding under and latching with them. One example of such a powered pusher 10 is best depicted in FIGS. 1, 2A, 2B, and 2C. According to one exemplary implementation, the powered pusher 10 can be used with known flatbed carts such as those used in stores such as, for instance, IKEA®.

Figure 1:
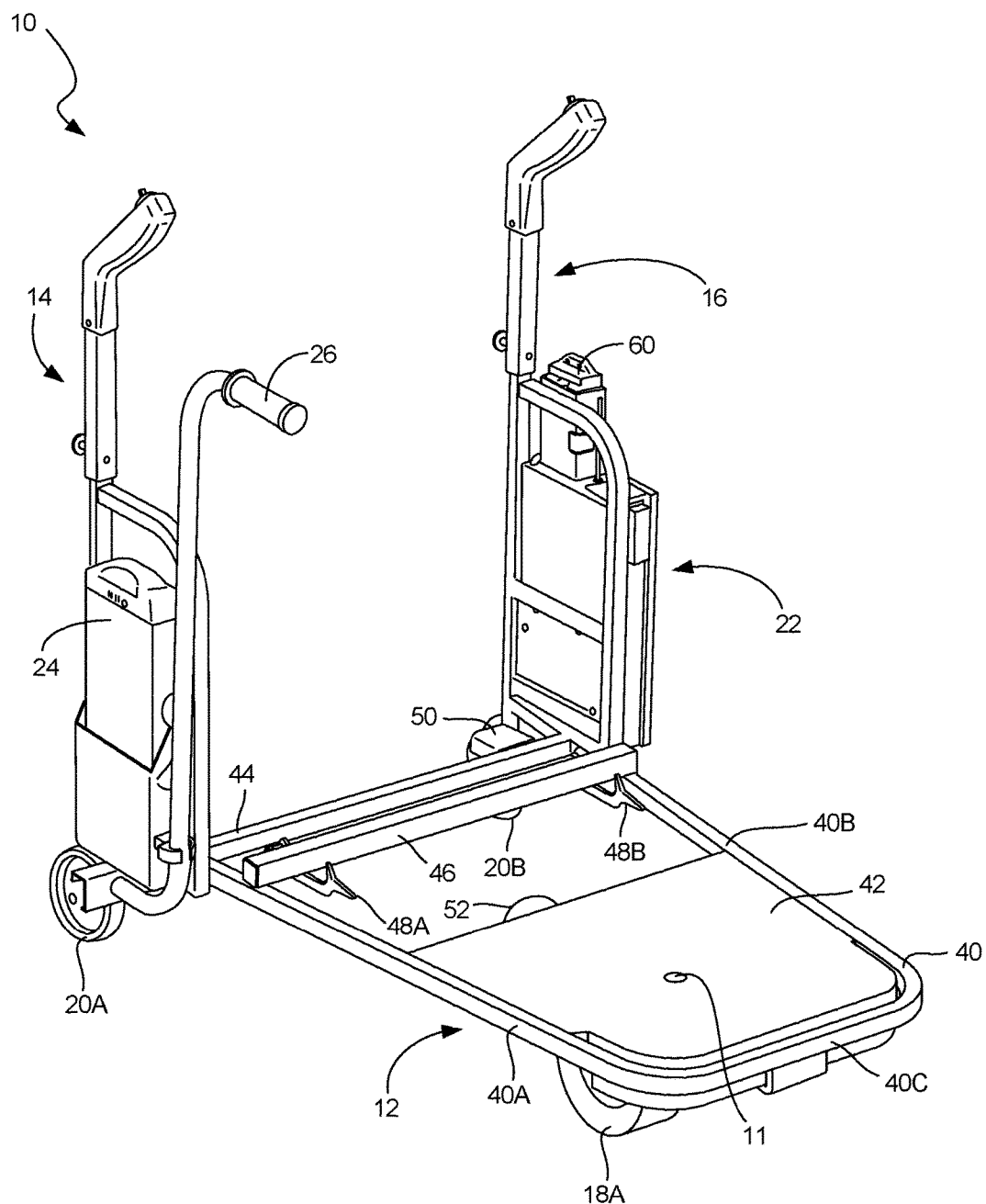
FIG. 1 is a front perspective view of a pusher, according to one embodiment.
Figure 2A:
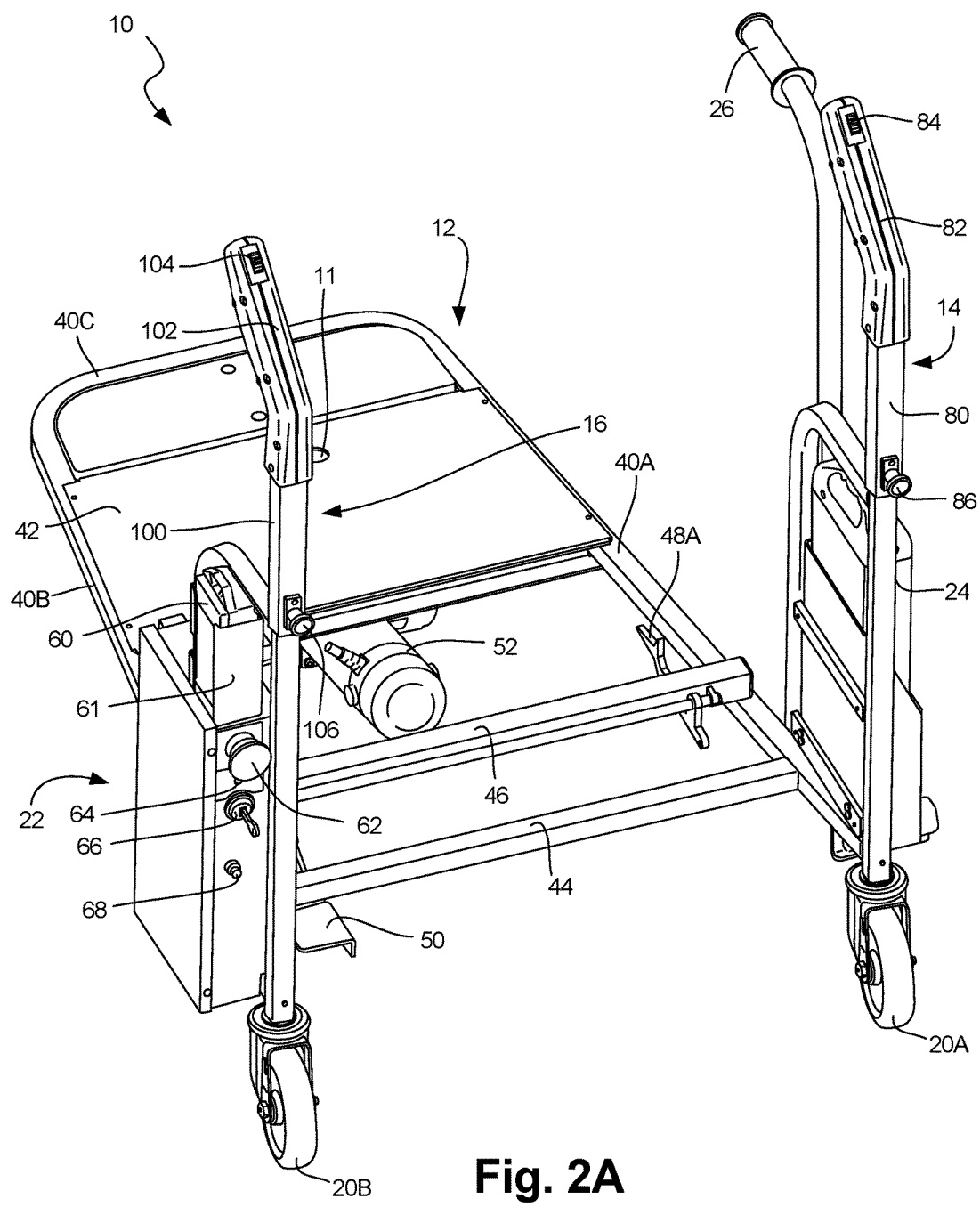
FIG. 2A is a rear perspective view of the pusher of FIG. 1, according to one embodiment.
Figure 2B:
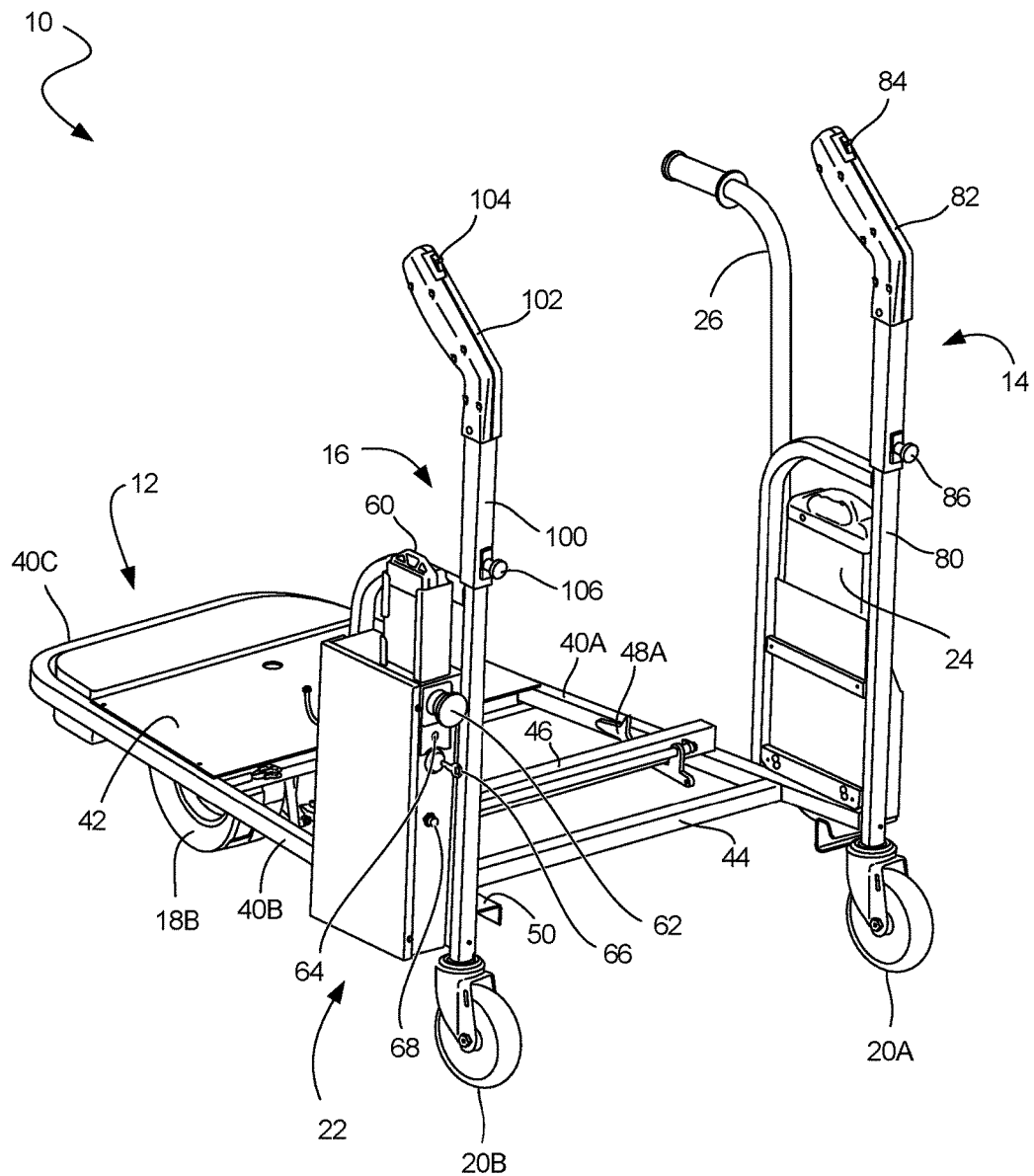
FIG. 2B is another rear perspective view of the pusher of FIG. 1, according to one embodiment.
Figure 2C:
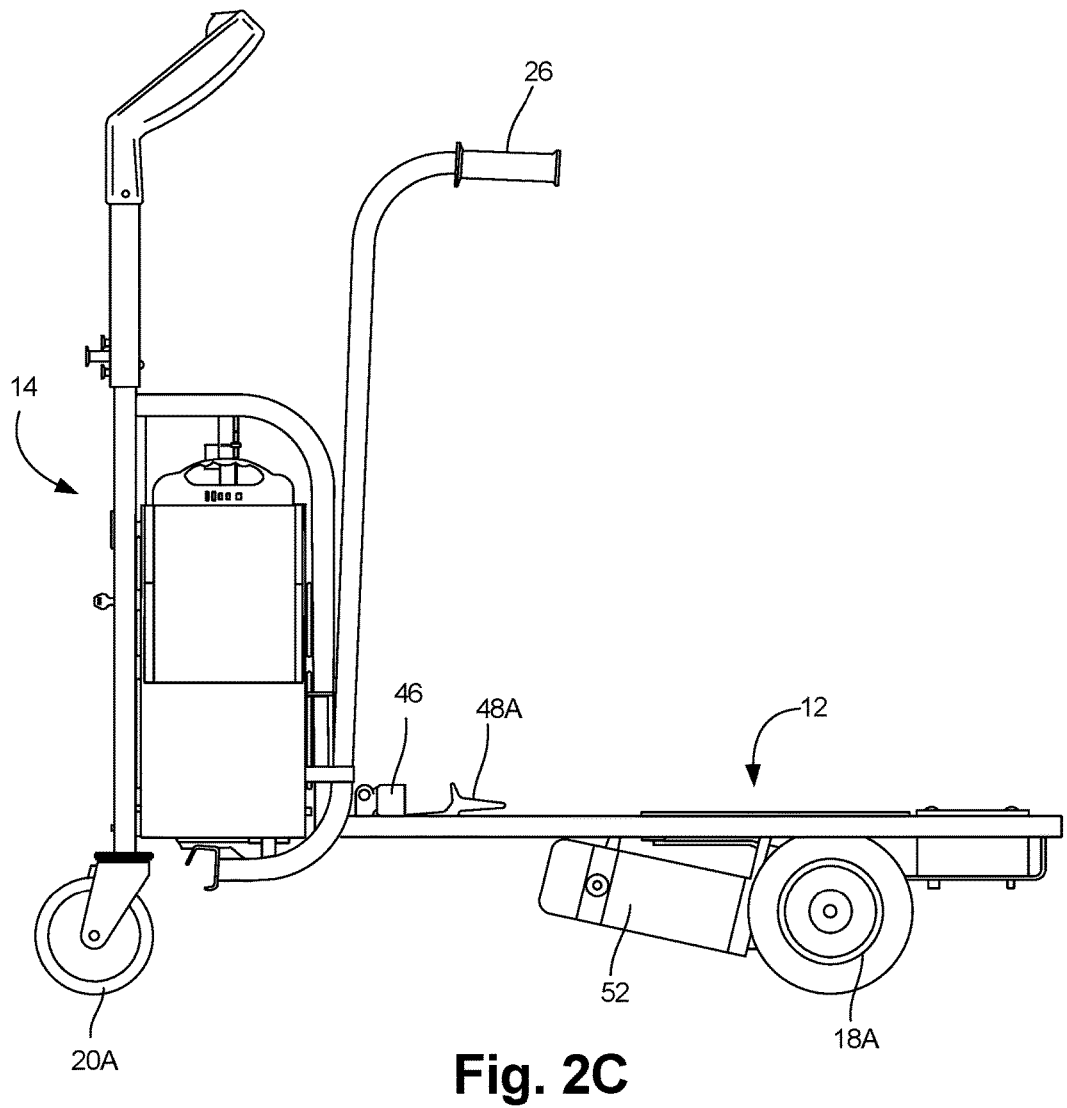
FIG. 2C is a side view of the pusher of FIG. 1, according to one embodiment.

As best shown in FIGS. 1, 2A, 2B, and 2C, the powered pusher 10 in this exemplary implementation has a base 12, a right control handle 14, a left control handle 16, four wheels 18A, 18B, 20A, 20B—including two front wheels 18A, 18B, and two back wheels 20A, 20B—a controller 22, a battery 24, a guide handle 26, and a motor 52 coupled to the front wheels 18A, 18B. The base 12 has a front base bar 40 with a right portion 40A, a left portion 40B, and a front portion 40C. Further, the base 12 has a base cover 42 coupled to the front base bar 40, a rear base bar 44, a latch bar 46, two latches 48A, 48B on the latch bar 46 (as best shown in FIGS. 1 and 2C), and a latch release lever 50 (as best shown in FIG. 2A). The controller 22 has a processor (not shown), an optional remote controller 60, an emergency shut-off switch 62, a status display 64, an actuation switch or button 66, and a remote programming button 68. As best shown in FIGS. 2A and 2B, the right control handle 14 has a right handle support 80, a right height adjustment pin 86, a right grip 82, and a right throttle 84 on or adjacent to the grip 82. Similarly, the left control handle 16 has a left handle support 100, a left height adjustment pin 106, a left grip 102, and a left throttle 104 on or adjacent to the grip 102.

According to one embodiment, the pusher 10 is a flatbed pusher 10 having a flatbed base 12. That is, the base 12 has a minimal height above the ground or floor on which the pusher 10 is positioned. According to one embodiment, the base 12 has a height of no more than about 7.5 inches. In a further embodiment, the base 12 has a height of no more than about 6.5 inches. In yet another embodiment, the base 12 has a height of no more than about 9 inches. The base 12, in accordance with one implementation, can have a height ranging from about 6.5 inches to about 12 inches. It is understood that the base 12 can have any height that allows the base 12 to be positioned under the wheeled object to be pushed by the pusher 10. One advantage of the short flatbed base 12 is the ability to position that base 12 under the cart or wheeled object when the pusher 10 is being coupled to that cart or object, as will be described in further detail below.

In one embodiment, the control handles 14, 16 can be used by a user to control the movement and positioning or "steer" the pusher 10. In one specific exemplary implementation, when the user is positioned behind—or proximal to—the pusher 10, the user can steer or control the direction of the pusher 10 as it moves forward or backward by pushing the control handles 14, 16 in the opposite direction of the desired direction of travel. That is, if the user desires to steer the pusher 10 to the right, then the user would push the handles 14, 16 to the left, and if the user desires to steer the pusher 10 to the left, then the user would push the handles 14, 16 to the right.

The adjustment pins 86, 106 can be used to adjust the height of the control handles 14, 16. That is, a user can remove the pins 86, 106 and adjust the height of the associated handles 14, 16 to match the height of the user, and then reinsert the pins 86, 106 to retain the handles 14, 16 at their new, adjusted height, thereby enhancing ease of use.

Figure 2D:
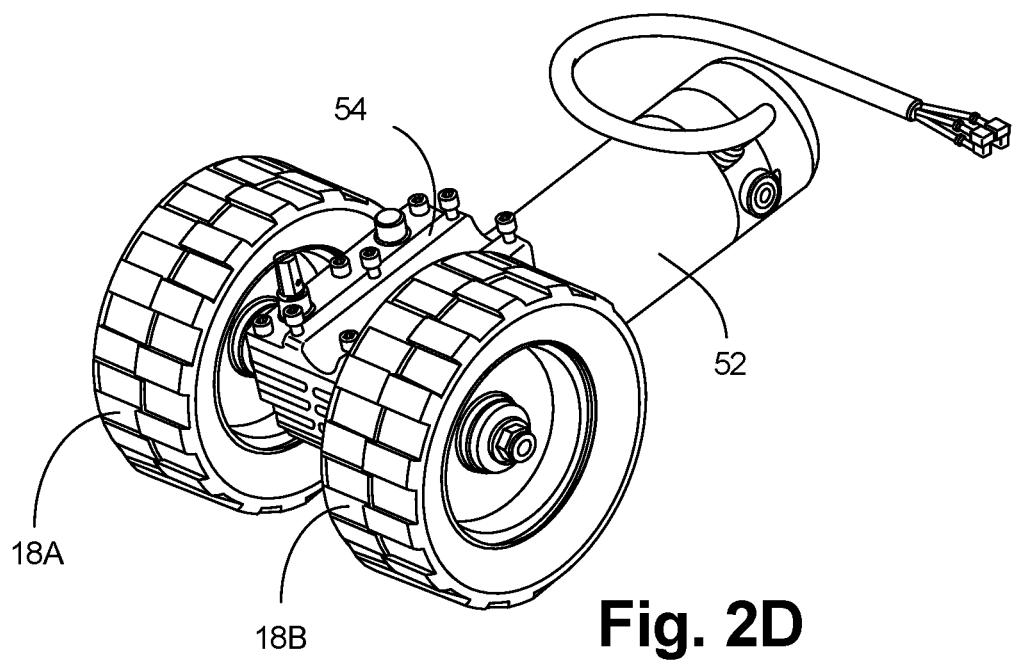
FIG. 2D is a perspective view of a motor and front wheels, according to one embodiment.

According to one embodiment, as best shown in FIG. 2D, the motor 52 is disposed under the base cover 42 and is coupled to the gear box 54, which is coupled to the wheels 18A, 18B. In one implementation, the motor is a known 450 watt two pole motor. Alternatively, the motor is a 650 watt four pole motor. In a further alternative, the motor is a 1,000 watt motor.

According to one embodiment, the pusher 10 has a two-position gear release (not shown) that can be accessed via the opening 11 in the base 12. If the pusher 10, 150 were to malfunction or stop working for any reason, the pusher 10, 150 can be moved to another location—such as, for example, a repair room or area—by moving the gear release (not shown) to the released position. That is, the user can insert a tool—such as a socket wrench or other appropriate tool—through the opening 11 in the base 12 and couple the tool to the gear release (not shown) and move the release to the released position. The pusher 10 cannot be caused to move forward or backward using the motor when the gear release is in the released position. Once the pusher 10 is repaired, the user can use the tool to move the release to the engaged position.

In one embodiment, the battery 24 is a 24-volt lithium ion battery. Alternatively, the battery 24 can be a 12-volt or 36-volt battery. Further, the battery 24 can be either a lithium battery or some other known type of battery. In a further embodiment, the battery 24 can be any battery that can provide sufficient energy to a pusher 10 to perform within the parameters described herein. In certain implementations, the battery 24 is any battery that provides at least approximately 3.5 hours of use of the pusher 10. Alternatively, the battery 24 provides at least approximately 5 hours of use of the pusher 10. In one embodiment, the battery 24 has a built-in energy level meter that provides an approximate amount of energy remaining in the battery. According to certain embodiments, each pusher 10 has at least two batteries 24 available such that one can be charging while the other is in user. When one battery 24 is used until it has no further energy, it can be removed from the pusher 10 and replaced with another battery 24 so that the first battery 24 can be recharged. Alternatively, the pusher 10 can have a battery 24 that is not removable and instead is charged while still connected to the pusher 10.

Figure 3:
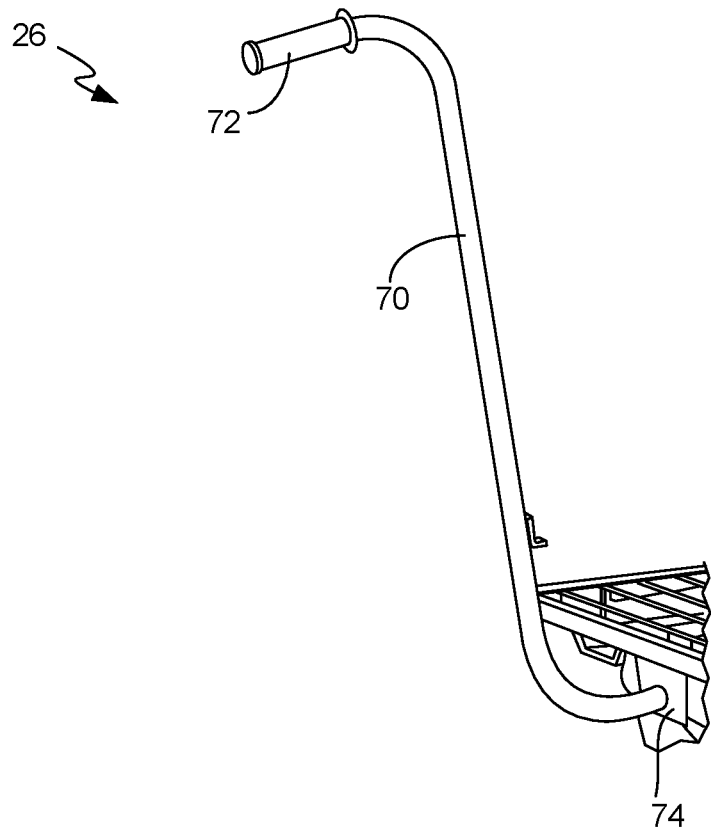
FIG. 3 is a perspective view of a guide handle, according to one embodiment.

As best shown in FIGS. 1 and 3, the guide handle 26, in accordance with one implementation, can be used by a user to guide or control the pusher 10 while the user is positioned at the side or in front of the pusher 10, instead of behind the pusher 10. In certain circumstances, the pusher 10 may be coupled to a cart that is loaded with items that are too long to fit entirely on the cart. In such circumstances, the items on the cart may extend proximally past the end of the cart and past the back end of the pusher 10 into the space typically occupied by the user who is controlling the pusher 10. Thus, those circumstances may prevent the user from standing behind the pusher 10, forcing the user to control the pusher 10 from another location. In such a situation, the user can stand next to or adjacent to the pusher 10 and use the guide handle 26 and, in certain embodiments, the remote control unit 60 described elsewhere herein.

The guide handle 26, according to one embodiment as best shown in FIG. 3, has a guide handle support 70, a guide handle grip 72, and a handle coupling component 74 that is configured to couple to some portion of one of the carts that is coupled to the pusher 10. According to one embodiment, the guide handle 26 is coupled to the cart that is coupled to the pusher 10. In one embodiment in which the pusher 10 is coupled to more than one cart, the handle 26 is typically coupled to the front-most or distal-most cart. In one implementation, the coupling component 74 is a bracket 74 that fits over and couples to a bar on the cart such that the bracket 74 can be easily coupled to and removed from the bar as best shown in FIGS. 3 and 10A-10C. The coupling component 74 can couple to a bar on the distal end of the cart or on the side of the cart and thereby can provide the user with a way to guide the cart(s) and pusher 10. Once the guide handle 26 is coupled to the cart, the user can use the handle 26 to help control the direction of or steer the cart(s) and pusher 10 by urging the handle 26 in the direction that the user desires to steer the cart(s) and pusher 10. In certain embodiments, the user can use the remote control unit 60 in combination with the guide handle 26 to steer the cart(s) and pusher 10. In one alternative, the guide handle 26 can be configured to be coupled directly to a portion of the pusher 10, especially in those situations in which the pusher 10 is coupled to a single cart or wheeled object.

In accordance with one embodiment, as best shown in FIGS. 1, 2A, 2C, 4A, 4B, and 4C, the latch bar 46 having two latches 48A, 48B is used to couple the pusher 10 to a cart or other wheeled object. As best shown in FIG. 2A, the two latches 48A, 48B are coupled to the latch bar 46 such that the latches are configured to move between a latching/latched position (as best shown in FIGS. 2A, 2C, 4A, and 4C) and an unlatching position (not shown) in which the latches 48A, 48B are positioned closer the floor or ground the pusher 10 is positioned on. The latches 48A, 48B are tensioned (or "spring-loaded") such that they are urged toward the latching/latched position (in the direction of arrow A in FIG. 4C) unless or until a user depresses the latch release lever or pedal 50, thereby urging the latches 48A, 48B toward the unlatching position (in the direction of arrow B in FIG. 4C).

Figure 4A:
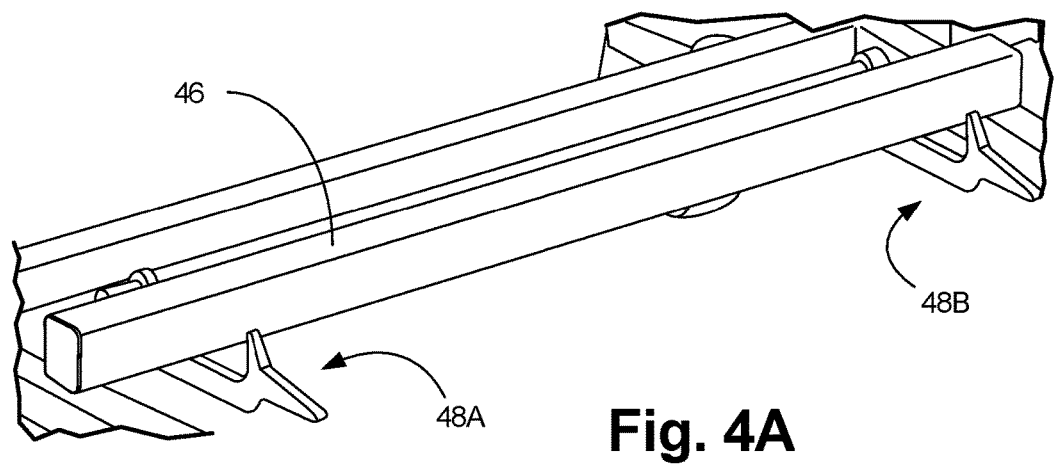
FIG. 4A is a front perspective view of a latching bar and associated latches, according to one embodiment.
Figure 4B:
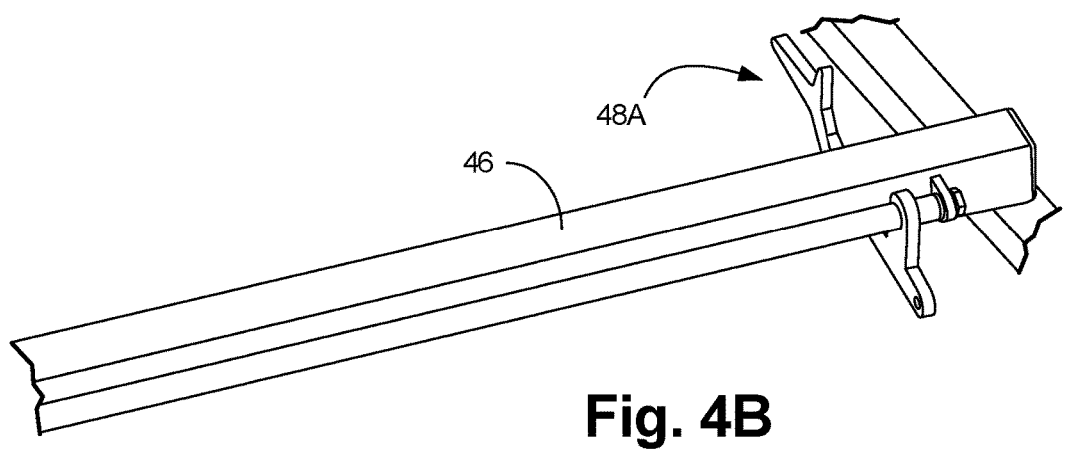
FIG. 4B is a rear perspective view of the latching bar and associated latches of FIG. 4A, according to one embodiment.
Figure 4C:
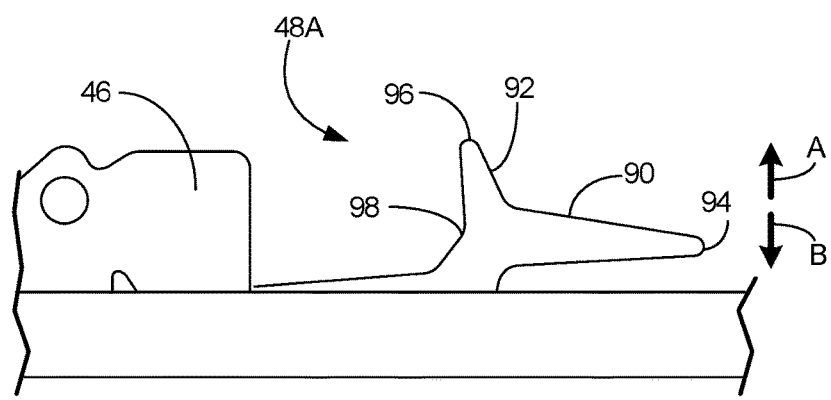
FIG. 4C is a side view of the latching bar and associated latches of FIG. 4A, according to one embodiment.

As best shown in FIG. 4C (in which only latch 48A is shown, but it is understood that latch 48B is substantially the same), both latches 48A, 48B, in one implementation, both have a distal projection 90 and an upward projection 92. The distal projection 90 has a narrow tip 94 and a thickness that progressively increases from the tip 94 to the upward projection 92. In use, as the pusher 10 is advanced toward a cart or other wheeled object for coupling thereto and the base 12 is positioned beneath the object, the two latches 48A, 48B advance toward the coupling bar or other similar coupling component (not shown) on the wheeled object. As the two latches 48A, 48B make contact with the coupling bar, the narrow tip 92 causes the distal portion of the distal projection 90 to be positioned beneath the coupling bar. And as the two latches 48A, 48B move forward, the increasing thickness of the projection 90 causes the top portion of the distal projections 90 to make contact with the coupling bar such that the latches 48A, 48B are urged downward (in the direction of arrow B) as the latches 48A, 48B are urged forward. This urging of the latches 48A, 48B downward as they are urged forward continues as the upward projections 92 make contact with the coupling bar. The slope of the distal projection 90 and the upward projection 92 allow for this urging of the latches 48A, 48B downward (in the direction of arrow B) as the latches 48A, 48B are urged forward. Once the tip 96 of the upward projection 92 moves past the coupling bar, the latches 48A, 48B are no longer restrained along the top of the distal projection 90 or upward projection 92 by the coupling bar, so the latches 48A, 48B move back toward the latched position (in the direction of arrow A). At this point, the coupling bar is retained proximal to the latches 48A, 48B by the back surface 98 of the upward projection 92. In this fashion, the pusher 10 is coupled via the latches 48A, 48B to the target wheeled object. In this configuration according to one implementation, the latches 48A, 48B allow for automatic coupling of the wheeled object to the pusher 10 such that all a user has to do if position the pusher 10 such that the base 12 is urged toward and under the object until the latches 48A, 48B make contact with the corresponding coupling component on the wheeled object. When the user is ready to uncouple the pusher 10 from the wheeled object, the user can depress the latch release pedal 50 (as best shown in FIG. 2A) with the user's foot, which causes the two latches 48A, 48B to move downward (in the direction of arrow B), thereby freeing the coupling bar of the wheeled object and allowing the pusher 10 to move proximally away from and uncouple from the wheeled object.

Figure 5:
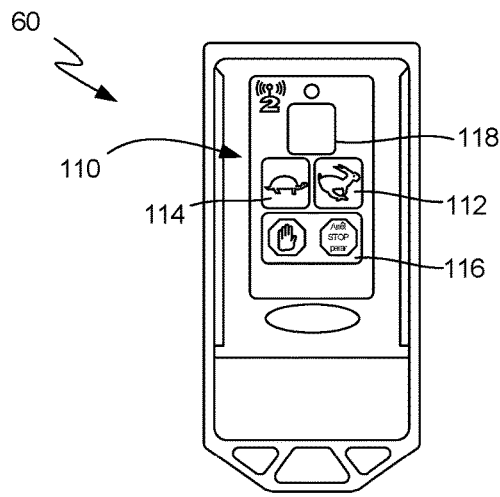
FIG. 5 is a front view of a remote control unit, according to one embodiment.

FIG. 5 depicts the optional remote control unit (also referred to as a "remote controller" or "remote") 60, according to one embodiment, which is also depicted in its "stored" configuration in FIGS. 1, 2A, and 2B. In the stored configuration, the remote unit 60 is positioned in a receptacle 61 in the pusher 10, as best shown in FIG. 2A. The remote unit 60 is in wireless communication with the controller 22 on the pusher 10 via any known form of wireless communication. The controller 60 has an interface 110 that includes control buttons that a user can utilize to operate the pusher 10 remotely. More specifically, the interface 110 has various actuation components or buttons that the user can utilize to cause the pusher 10 to move or stop. In one embodiment, the interface 110 has two buttons for two different speeds: a fast speed button 112 and a slow speed button 114. According to certain implementations, the user can press and hold the fast speed button 112 to cause the pusher 10 to move at a predetermined speed, or the user can press and hold the slow speed button 114 to cause the push to move at a predetermined speed that is slower than the predetermined fast speed. In one embodiment, the fast speed button 112 and slow speed button 114 are configured solely for actuating forward movement of the pusher 10, not backward or reverse movement. Alternatively, the buttons 112, 114 or additional buttons can be used to move the pusher 10 forward or backward in a fast speed or a slow speed. The interface 110 can also have a stop button 116 that the user can press to actuate the controller 22 to cause the pusher 10 to stop, including in an emergency situation. In some implementations, the interface 110 also has a horn button 118 that can be pressed to cause the controller to actuate an audible horn sound to provide a warning to people nearby. In one implementation, only one button of the remote unit 60 is usable at a time. In certain embodiments, the pusher 10 will briefly coast when the control buttons of the interface 110 are released by the user. Further, it is understood that the remote unit 60 can have any known button or other actuation component for actuating the controller to cause any known action to be performed by the pusher 10.

Returning to FIGS. 2A and 2B, the actuation switch or button 66 in this specific exemplary embodiment is a three-position actuation key 66 that can be used to put the pusher 10 in the "manual" mode, the "wireless" mode, or the "off" mode. The key 66 can be physically moved between three different positions that correspond to these three different modes. Alternatively, the actuation switch or button 66 can be a button, a switch, or any other known actuation component.

In a further alternative, the controller 22 can also have a coded keypad (not shown) that requires a user to enter a predetermined code in order to be able to put the pusher 10 in any of the above operational modes. This predetermined code prevents non-qualified people from attempting to operate the pusher 10.

The status display 64 (as best shown in FIGS. 2A and 2B), according to one embodiment, is a status light 64 that will display a solid green light when the pusher 10 is turned on and operating properly. In one implementation, if the emergency shut off button 62 is depressed or some portion of the pusher 10 is not functioning properly, the status light 64 will flash in a coded fashion and/or display a code that indicates the cause of the malfunction. Alternatively, it is understood that the status display 64 can be any type of known display for providing information to user about the status of the pusher 10.

According to one implementation, the emergency shut-off switch 62 (as best shown in FIGS. 2A and 2B) is a button 62 that can be depressed by a user to stop the pusher 10, including in case of an emergency. In accordance with one embodiment, depressing the button 62 causes the pusher 10 to stop quickly. One implementation of the button 62 remains depressed and in the "shut-off" mode until a user pulls the button 62 back to its unactuated position.

In one embodiment, as discussed above, the right grip 82 has a right throttle 84 and the left grip 102 has a left throttle 104. FIG. 7A depicts the left grip 102 with the left throttle 104 in further detail. It is understood that the right grip 82 and right throttle 84 are substantially the same as the left grip 102 and throttle 104 as depicted in FIG. 7A. According to one implementation, the left throttle 104 is a throttle lever 104 that has a center position, a forward position in which the lever 104 is urged upward as shown by Arrow C toward the top of the grip 102, and a backward position in which the lever 104 is urged downward as shown by Arrow D toward the bottom of the grip 102. A user can use her or his thumb (or any digit) to move the lever 104 between the three positions. The center position is the default position in which the pusher 10 is at rest. When the lever 104 is moved into the forward position, the lever 104 actuates the controller 22 to cause the pusher 10 to move forward. In contrast, when the lever 104 is moved into the backward position, the lever 104 actuates the controller 22 to cause the pusher 10 to move backward. It is understood that, in this embodiment, the right throttle 84 has the same three positions and works in the same manner.

Alternatively, as shown in FIGS. 7B and 7C, the left grip 102 can have a left throttle 104 and a fast/slow switch 105 (as shown in FIG. 7B) and the right grip 82 can have a right throttle 84 and a horn switch 85. According to one embodiment, the throttles 84, 104 operate in a fashion similar to that described above with respect to FIG. 7A. The fast/slow switch 105 can be used by the user to select between the fast mode and the slow mode by simply actuating the appropriate portion of the switch 105 as shown in the figure. The horn switch 85 can be used by the user to actuate the horn by simply actuating the appropriate portion of the switch 105 as shown in the figure. In this alternative embodiment, the throttles 84, 104 are positioned on the grips 82, 102 such that they are disposed closer to the center of the pusher 10 in relation to the switches 105, 85. Alternatively, the throttles 84, 104 and switches 85, 105 can be configured in any positions in relation to each other. In a further alternative, the grips 82, 102 can have any known actuation mechanisms or buttons for operating the pusher 10.

In accordance with one implementation, the throttle levers 84, 104 control acceleration and braking. That is, the pusher 10 speed and direction (forward or backward) are controlled by actuation of the throttle levers 84, 104 as described above—either by urging the throttle 84, 104 to the forward position or to the backward position. In certain exemplary embodiments, when the user removes her or his finger or decreases the amount of pressure applied to the lever 84, 104, the lever 84, 104 is configured to return to the center position. That is, each lever 84, 104 is tensioned such that the lever 84, 104 is urged toward the center position when no force is being applied by a user to move it toward the forward or backward position. According to certain implementations, the pusher 10 is actuated by the controller 22 to begin braking when the lever 84, 104 moves back toward the center position. Thus, in this implementation, the braking force can be controlled for quick or gradual stops. That is, if the user releases the lever 84, 104 or allows it to return to the center position slowly, the controller 22 is actuated to bring the pusher 10 to a gradual stop. In contrast, if the user releases the lever 84, 104 or allows it to return to the center position quickly, the controller 22 is actuated to bring the pusher 10 to a fast stop.

In accordance with one implementation, the two back wheels 20A, 20B are swivel wheels 20A, 20B while the two front wheels 18A, 18B are fixed wheels 18A, 18B. That is, the two back swivel wheels 20A, 20B rotate 360 degrees on their swivel couplings (also referred to as "swivel casters") (not shown) that couple the wheels 20A, 20B to the base 12, while the two front wheels 18A, 18B have fixed couplings (also referred to as "fixed casters") (not shown) that couple the wheels 18A, 18B to the base 12. Further, in this embodiment, two back wheels 20A, 20B are coupled to the right 14 and left 16 handles, respectively, such that the wheels 20A, 20B are spaced apart from each other on either side of the base 12, thereby creating a predetermined distance between the two wheels 20A, 20B that is at least substantially as wide as the base 12. In contrast, the two front wheels 18A, 18B are positioned much closer together. According to one embodiment, the two front wheels 18A, 18B are 4 inches apart. Alternatively, the two front wheels 18A, 18B can be 6 inches apart. In a further alternative, the distance between the wheels can vary from 4 inches to 8 inches apart, depending on the embodiment.

Further, in certain implementations, the two front wheels 18A, 18B are not positioned at the distal end of the pusher 10. That is, the two front wheels 18A, 18B are positioned beneath the base 12 and proximally from the front portion 40C of the base bar 40 such that there is a distance between the front portion 40C and the wheels 18A, 18B. According to one implementation, the wheels 18A, 18B are positioned about 10 inches proximally from the front end of the base 12. Alternatively, the wheels 18A, 18B are positioned from about 6 inches to about 14 inches proximally from the front end of the base 12. In a further alternative, the distance between the wheels 18A, 18B and the front end of the base 12 can vary depending on the embodiment and on the types of wheeled objects to be pushed.

This wheel configuration (2 closely-spaced, more centrally-positioned front fixed wheels 18A, 18B and two rear swivel wheels 20A, 20B) provides great maneuverability in the form of a small turning radius and easy directional control. The small turning radius results from a turning axis at the two fixed front wheels 18A, 18B positioned beneath the base 12 that allows the pusher 10 to be rotated 360 degrees on that turning axis. The location of the two front wheels 18A, 18B beneath the base 12 and spaced proximally from the front end of the base 12 results in the turning axis being positioned at a more central position of the pusher 10, thereby resulting in the pusher 10 being capable of rotating around a more centrally located turning axis, thereby reducing the turning radius of the pusher 10. In contrast, any cart, pusher, or other wheeled object with swivel wheels at one end of the object and fixed wheels positioned at the other end (rather than being positioned at a more central position) has a turning axis at that end of the object (rather than closer to the center or middle of the object), thus resulting in an inherently larger turning radius. One example of a wheeled object with a turning axis at the end (and thus a larger turning radius) is the standard shopping cart. In this exemplary embodiment, the pusher 10 has a reduced turning radius as a result of the pusher 10 being able to rotate around a centrally located turning axis rather than a turning axis at one end of the pusher 10 or the other.

The easy directional control results from the fixed nature of the front wheels 18A, 18B. That is, the front fixed wheels 18A, 18B make it easy for a user to control the direction of the pusher 10 (and the wheeled object(s) being pushed by the pusher 10) in comparison to swivel wheels. While swivel wheels swivel easily around the swivel axis and thus result in a user having difficulty in moving any object on such swivel wheels from one point to another in a relatively straight line, fixed wheels don't create that same problem.

Instead, fixed wheels facilitate easy movement of an object from location to another in a fairly direct fashion with little or none of the deviation or meandering that can be caused by swivel wheels. The standard shopping cart with its rear fixed wheels is another example of this.

As such, the combination of fixed front wheels 18A, 18B positioned close together proximally from the front of the pusher 10 beneath the base 12 and rear swivel wheels 20A, 20B results in a pusher 10 that can be maneuvered easily by a user.

Another advantage of the wheel configuration of this pusher 10 embodiment is that it can easily push many types of carts or other wheeled objects. For example, the pusher 10 can easily couple to a cart with four swivel wheels and push that cart with easy maneuverability. That is, the maneuverability capabilities described above with respect to the pusher 10 are effective when the pusher 10 is coupled to a cart or other wheeled object with four swivel wheels, because the wheel configuration of the pusher 10 provides the benefits described in detail above relating to a minimal turning radius and easy control of direction.

In the pusher 10 as shown in FIGS. 1-2B, the right and left control handles 14, 16 are coupled to the right 40A and left 40B portions of the front base bar 40, respectively, such that the handles 14, 16 spaced apart from each other on either side of the base 12, thereby creating a predetermined distance between the two handles 14, 16 that is at least substantially as wide as the base 12. Thus, the handles 14, 16 define a predetermined amount of space between the two handles 14, 16 proximal from the base 12 that allows for proximal extension between the two handles 14, 16 and proximal therefrom of any items being carried on a cart coupled to the pusher 10 (such as the cart coupled to the pusher 10 in FIG. 9, for example, which is described in additional detail below) such that the items can be positioned on the cart and extend proximally between the handles 14, 16 and proximally of the handles 14, 16 and the base 12. As such, this configuration of the pusher 10 with the spaced handles 14, 16 allows for unobstructed use of a cart (such as the cart in FIG. 9) with items extending proximally from the cart, as will be discussed in additional detail below.

In one embodiment, the device 10 can move a cart loaded with at least 440 lbs (200 kg). Alternatively, the device 10 can move a cart loaded with more than 440 lbs. In further implementations, any pusher embodiments having greater battery voltage and/or motors with greater wattage can push a cart loaded with significantly more than 440 lbs.

In accordance with certain implementations, the pusher 10 is a platform pusher 10 that can be coupled to a wide variety of different wheeled objects. That is, the pusher 10 can be the platform pusher 10 for a family of wheeled objects that can be coupled with the pusher 10 and subsequently pushed by the pusher 10. In certain embodiments, the pusher 10 can be automatically coupled to the family of wheeled objects, as will be described in further detail below. The family of wheeled objects can include the various carts disclosed or contemplated herein, including the carts as depicted in FIGS. 9A-14C. These carts and the coupling of those carts to a pusher such as pusher 10 will be described in additional detail below.

Figure 6A:
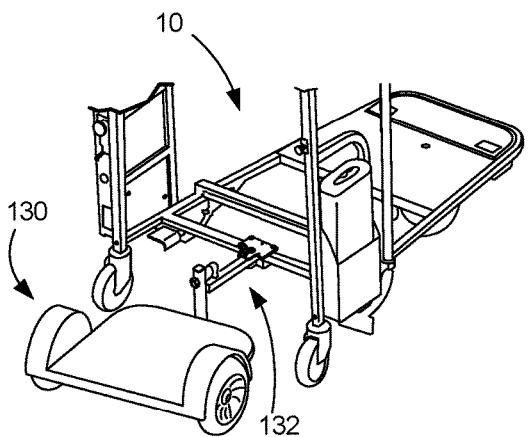
FIG. 6A is a rear perspective view of a pusher with a sulky, according to one embodiment.
Figure 6B:
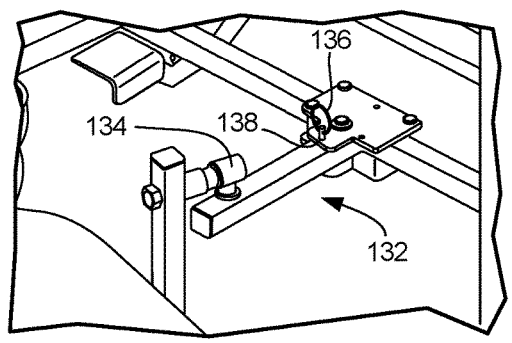
FIG. 6B is a perspective view of the hitch and coupling component for the sulky of FIG. 6A, according to one embodiment.
Figure 6C:
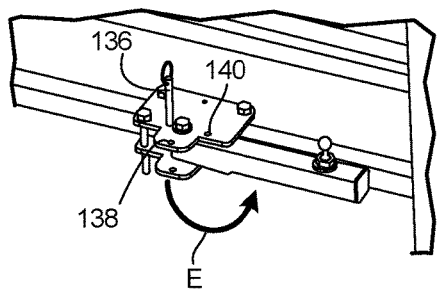
FIG. 6C is a perspective view of the hitch of FIG. 6A, according to one embodiment.

One optional component, according to certain embodiments, is a detachable wheeled user platform (also referred to herein as a "sulky") 130 as shown in FIGS. 6A-6C that can be coupled to a hitch 132 on the proximal end of the pusher 10. According to one embodiment, the sulky 130 allows the user to be positioned proximal to the pusher 10 and ride along with the pusher 10 rather than walking during use. The sulky 130 has a coupling component 134 that can be removably coupled to the pusher hitch 132. According to one embodiment, the coupling component 134 is a quick disconnecting coupling component 134 that is positioned over a ball (not shown) positioned on the end of the hitch 132 such that the coupling component 134 can be lockably coupled to the ball and easily unlocked and removed from the ball and the hitch 132 with a single movement of the coupling component 134. Alternatively, any coupling component 134 can be used with any corresponding configuration on the hitch 132.

In another implementation, the hitch 132 can be moved between an extended position and a retracted position as best shown in FIG. 6C. The hitch 132 can be moved into the retracted position when the hitch 132 is not in use. The hitch 132 is rotatably coupled to the pusher 10 such that a pin 136 is positioned through first opening 138 and through the hitch to hold it in the extended position as shown in FIG. 6B. When the user is not using the sulky 130, the user can pull up on the pin 136 and remove it from the first opening 138, thereby releasing the hitch 132 so that the hitch 132 can be rotated to the retracted position in the direction shown by Arrow E as shown in FIG. 6C. Once the hitch 132 is in the retracted position, the pin 136 can be placed in the second opening 140, thereby locking the hitch 132 in that retracted position. It is understood that a user can reverse these steps when the user wants to deploy the hitch 132 to attach the sulky 130.

An alternative pusher 150 embodiment is depicted in FIGS. 8A-8D. It is understood that this pusher 150 has components substantially similar to those components discussed above with respect to pusher 10 except as set forth below. It is further understood that the above description of the pusher 10 and related figures apply equally to the pusher 150 except as specifically stated herein. According to one implementation, this pusher 150 is configured to operate in larger environments, such as distribution centers and other such locations. Alternatively, the pusher 150 can be used in any environment.

Figure 8B:
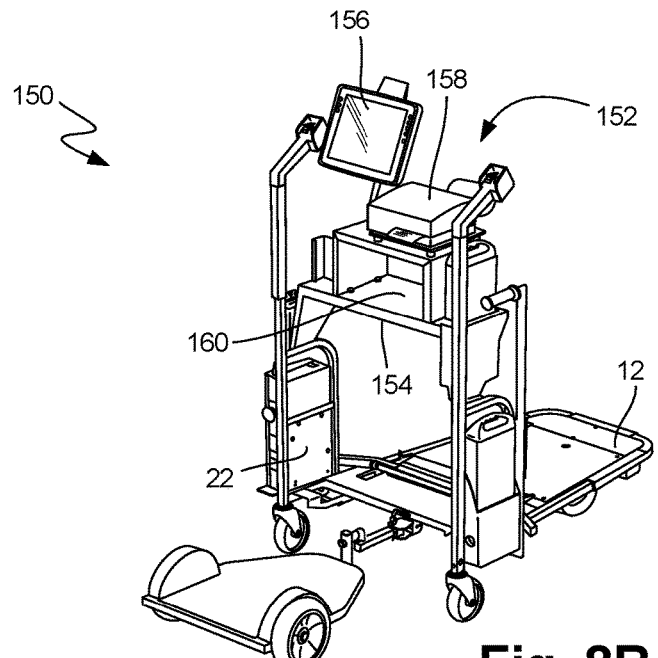
FIG. 8B is a rear perspective view of the pusher of FIG. 8A, according to one embodiment.
Figure 8C:
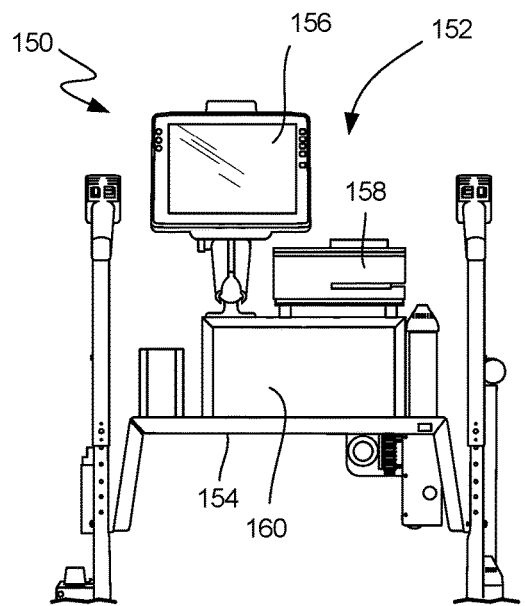
FIG. 8C is a rear view of the pusher of FIG. 8A, according to one embodiment.

As best shown in FIGS. 8B and 8C, the pusher 150 has a user console 152 that includes a console base 154, a touchpad interface 156, a printer 158, and a storage receptacle 160 positioned on the base 154. The touchpad interface 156 is coupled to the processor 22 and can be used by the user to control various functions and portions of the pusher 150. Further, the interface 156 is coupled to the printer 158 such that a user can process orders or perform other functions and print out the resulting output in paper format using the printer 158. Alternatively, the console 152 can be tailored to have any equipment or components that may be desirable depending on the specific use of the pusher 150.

Figure 8D:
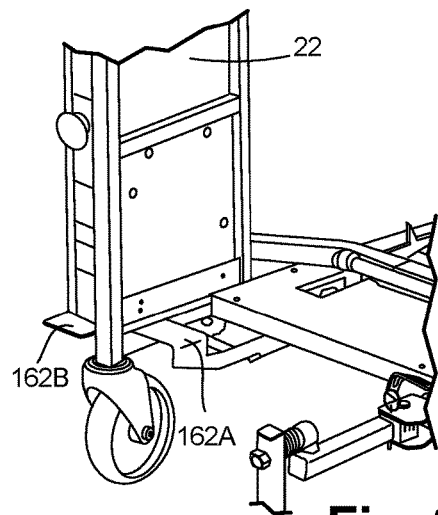
FIG. 8D is a close-up perspective view of a portion of the pusher of FIG. 8A, according to one embodiment.

According to one exemplary embodiment as best shown in FIG. 8D, the pusher 150 also has a two-pedal latch release lever 162 that includes a first pedal 162A disposed proximal to the base 12 (a position similar to the latch release pedal 50 in FIG. 2A and discussed above) and a second pedal 162B coupled to the first pedal 162A and positioned proximal to the controller 22. The second pedal 162B in this embodiment makes it easier for a user to depress the latch release lever 162 and thereby release the pusher 150 from any cart or wheeled object to which the pusher 150 is coupled in those situations in which the user is not able to stand behind or proximal to the pusher 150 (such as when products or other objects on the cart or other wheeled object are extending past the proximal end of the pusher 150).

In use, the various pusher embodiments disclosed or contemplated herein (such as pushers 10 and 150) can be used in various modes—as mentioned above—to push various wheeled objects such as carts in various retail, warehouse, and other environments. When the user is positioned behind or proximal to the pusher (such as pushers 10, 150) and uses the control handles 14, 16 and throttle levers 84, 104 to control or steer the pusher, that is called the "manual mode." Alternatively, when the user is positioned adjacent to (beside or in front of) the pusher 10, 150 and uses the guide handle 26 in combination with the remote unit 60 as discussed above, that is called the "wireless mode" (also referred to herein as the "remote mode" or "radio mode").

According to certain embodiments, when the user wants to operate the pusher 10, 150 in manual mode, the user turns the actuation key 66 to the position corresponding to the manual mode. On the other hand, if the user wants to operate in the wireless mode, the user turns the actuation key 66 to the position corresponding to the wireless mode. Further, when the user is ready to power down the pusher 10, 150, the user turns the key 66 to the off position.

In the manual mode, the user positions herself or himself behind, proximal to, or to the side of the pusher 10, 150, turns the actuation key 66 to the manual mode position, and controls the pusher 10, 150 with the control handles 14, 16, the throttle levers 84, 104, and the other components of the pusher 10, 150 that are physically accessible when the user is in that position. In certain embodiments, the user can couple the sulky 130 to the pusher 10, 150 and operate in manual mode while positioned on the sulky 130. Alternatively, the user can operate the pusher 10, 150 in manual mode without the sulky 130.

In the manual mode, the user uses the control handles 14, 16 to control the pusher 10, 150 as described in further detail above. That is, the user can cause the pusher 10, 150 to move forward or backward using the throttle levers 84, 104. In one embodiment, either lever 84, 104 can be used at any given time, and the user can switch from using one to the other during operation of the pusher 10, 150. That is, whichever throttle lever 84, 104 is used first by the user—either the right lever 84 or the left lever 104—will be the "active lever" that is in communication with the controller 22 until that first lever is returned to its center position. Once the first lever is returned to its center position, then either lever 84, 104 can be actuated to become the "active lever." Both levers 84, 104 control the pusher 10, 150 in the same way with respect to acceleration and braking, as described in further detail above.

Further, in manual mode, in one embodiment as described above, the user can steer or direct the pusher 10, 150 to turn in one direction or the other by pushing the control handles 14, 16 in the opposite direction. Alternatively, the user can steer the pusher 10, 150 by pushing the handles 14, 16 in the same direction as the user desires for the pusher 10, 150 to turn.

Figure 9A:
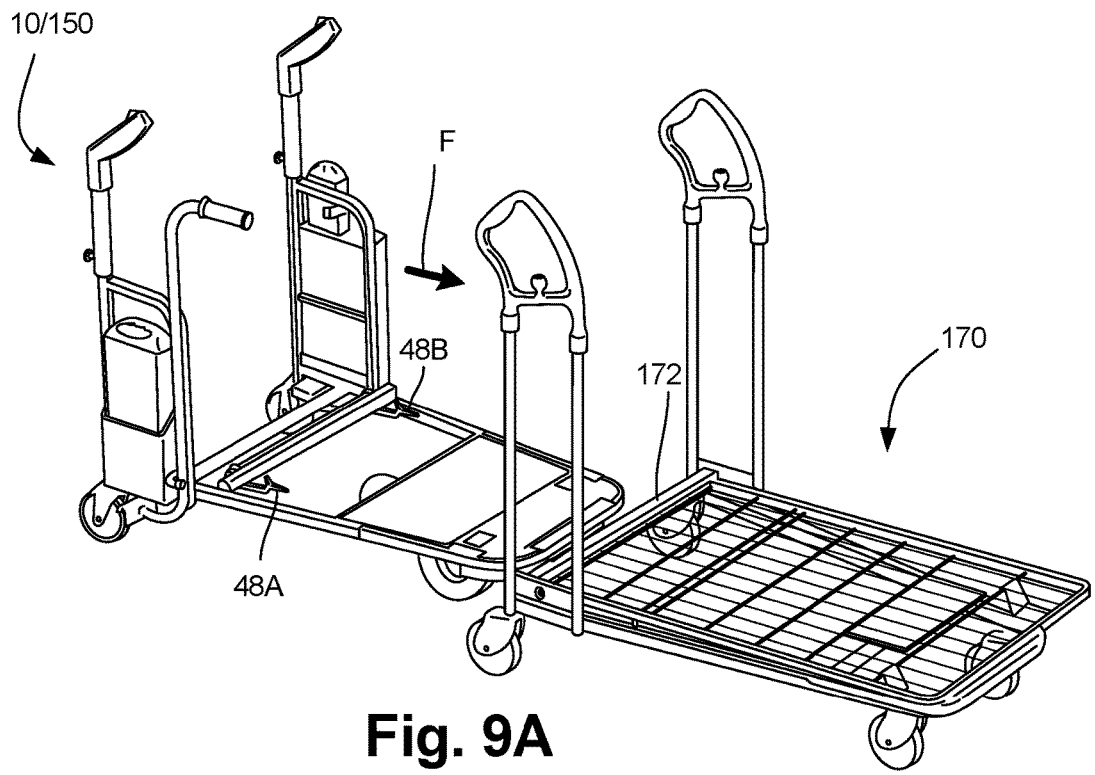
FIG. 9A is a perspective view of a pusher being coupled to a cart, according to one embodiment.
Figure 9B:
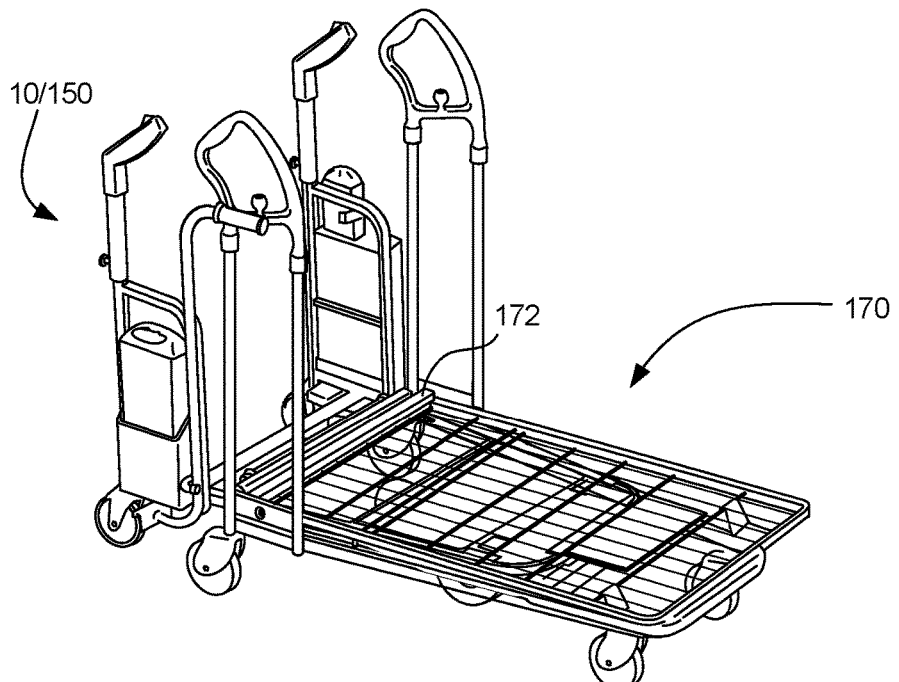
FIG. 9B is a perspective view of a pusher coupled to a cart, according to one embodiment.
Figure 9C:
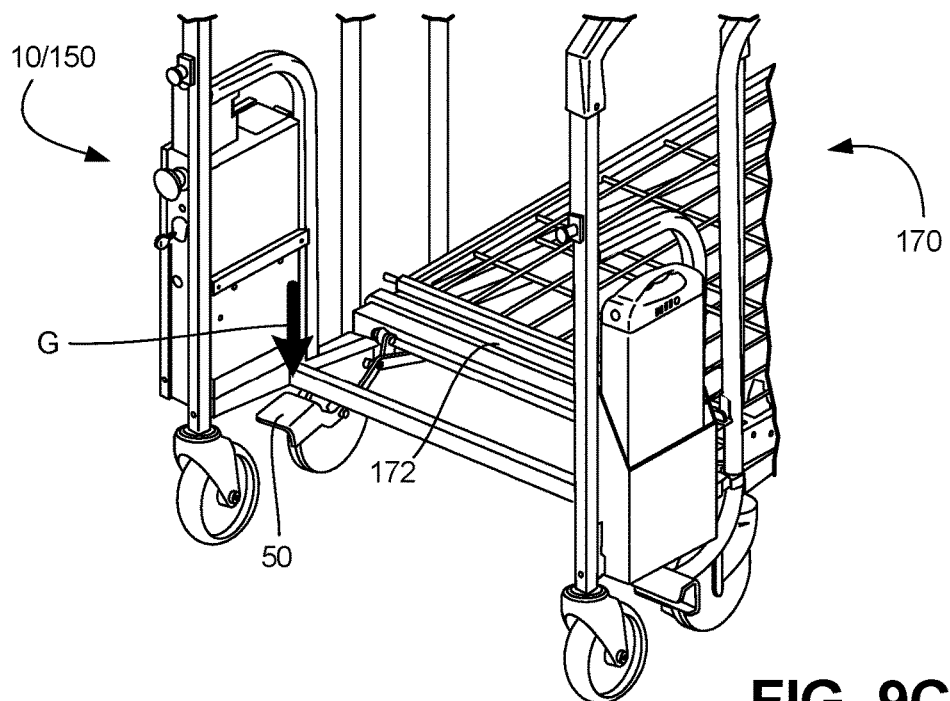
FIG. 9C is a rear perspective view of a pusher coupled to a cart, according to one embodiment.

As shown in FIG. 9A, the pusher 10, 150 can be coupled to a flatbed cart 170 (or any other cart or wheeled object) in the following manner. The user aligns the pusher 10, 150 such that the pusher 10, 150 is positioned proximal to the cart 170 and then moves the pusher 10, 150 toward the cart 170 as shown by Arrow F. As the pusher 10, 150 is urged forward as shown in FIG. 9B, the base 12 is positioned beneath the cart 170 and the latches 48A, 48B move distally past the coupling bar 172 on the cart 170, thereby causing the latches 48A, 48B to couple to the bar 172 as described in further detail above. Once the pusher 10/150 is coupled to the cart 170 in this fashion, the user can actuate the pusher 10/150 to move the cart 170 to the desired location. As shown in FIG. 9C, once the cart 170 is positioned in the desired location, the user can disconnect or uncouple the pusher 10/150 from the cart 170 by depressing the latch release lever 50 (or the dual-pedal release lever 162) in the direction shown by Arrow G. The depressing of the lever 50 (or 162) causes the latches 48A, 48B to uncouple from the bar 172, thereby releasing the pusher 10/150 from the cart. At that point, the user can back the pusher 10/150 away from the cart 170 and leave the cart 170 in the desired location.

Figure 10A:
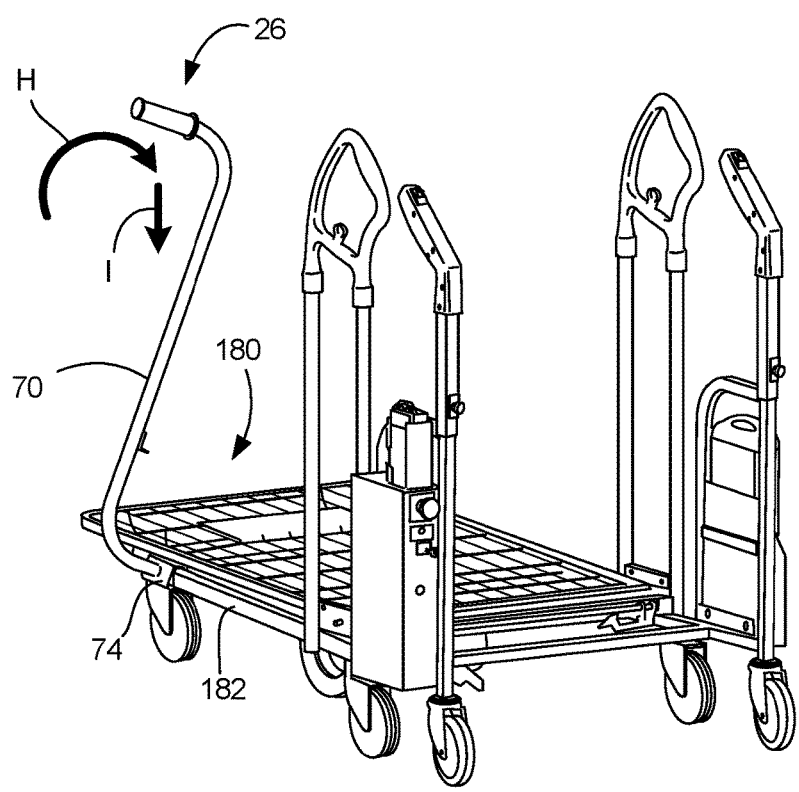
FIG. 10A is a perspective view of a guide handle being coupled to a cart, according to one embodiment.
Figure 10B:
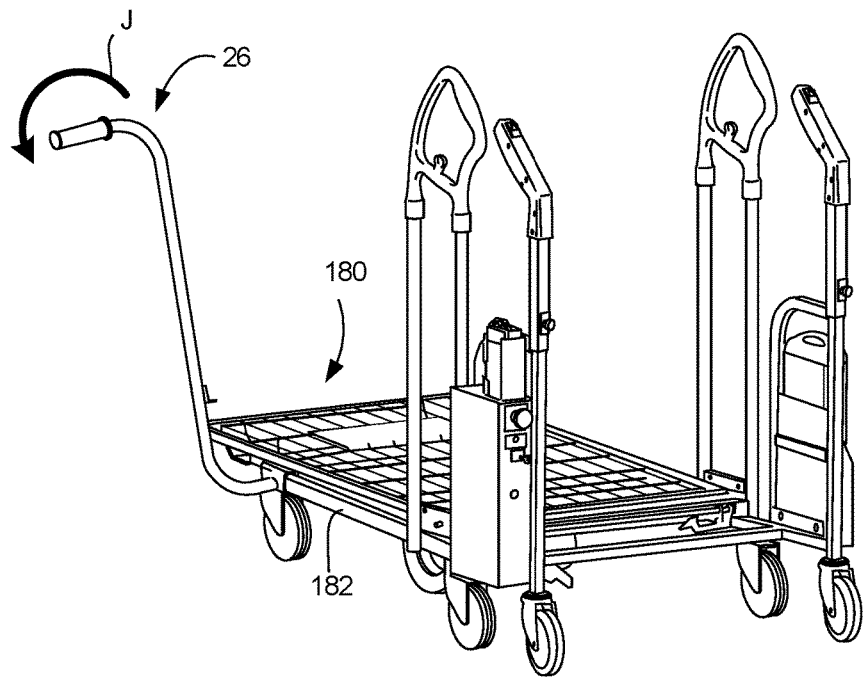
FIG. 10B is a perspective view of a guide handle coupled to a cart, according to one embodiment.
Figure 10C:
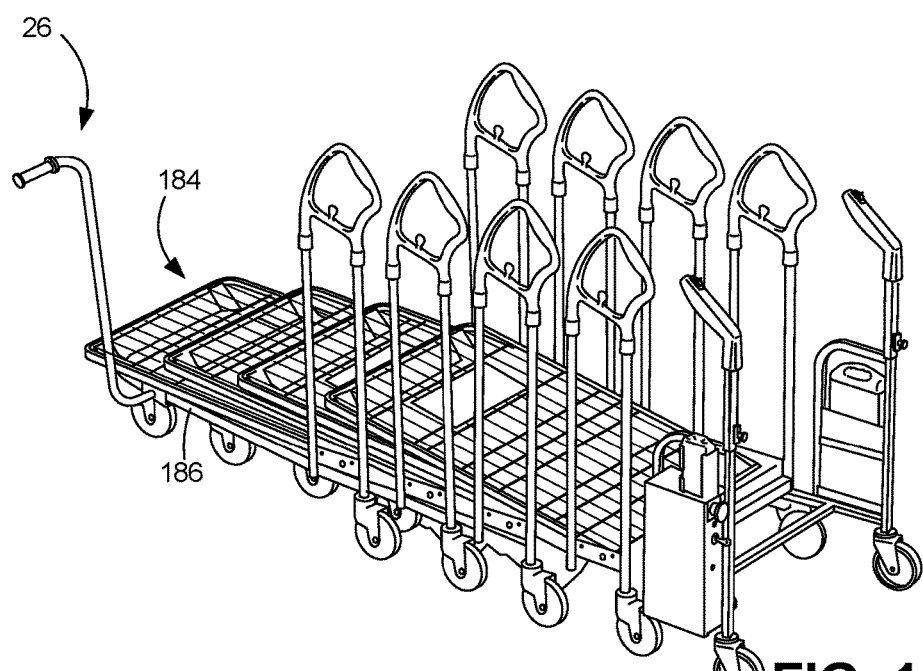
FIG. 10C is a perspective view of a guide handle coupled to the front cart of a line of carts, according to one embodiment.

In contrast, in the wireless mode according to one embodiment, the user turns the actuation key 66 to the wireless mode position, pulls the remote unit 60 from the remote unit receptacle 61 on the pusher 10/150, and places the guide handle 26 at a desired location on a portion of a cart, such as, for example, a bar 182 on the cart 180 as shown in FIG. 10A (and as described in further detail above). More specifically, in this particular embodiment, the user positions the guide handle 26 such that the handle coupling component 74 is adjacent to and above the bar 182 and tilts the handle 26 in the direction shown in Arrow H by moving the top portion of the handle support 70 toward the cart 180 while moving the bottom portion away, thereby optimally positioning the coupling component 74 for coupling with the bar 182. Once the coupling component 74 is optimally positioned as described, the handle 26 is moved downward in the direction shown by Arrow I, thereby putting the coupling component 74 into contact with the bar 182. Once the coupling component 74 is in contact with the bar 182 such that the bar 182 is positioned in the coupling component 74, the handle 26 is allowed to tilt back to its natural, coupled position as shown in FIG. 10B. That is, the handle 26 is allowed to tilt back in the direction shown by Arrow J, thereby completing the coupling of the handle 26 to the bar 182 on the cart 180. According to one alternative embodiment, instead of using the guide handle 26 to control the direction of the pusher 10, 150, the user can use one of the control handles 14, 16 for the same purpose.

Once the guide handle 26 is coupled at the desired location as described above, the user can position herself or himself adjacent to the guide handle 26 with the remote unit 60 in hand, grasp the guide handle 26, and control the cart(s) (such as cart 180) and pusher 10, 150 with the guide handle 26 and the remote unit 60 as described in additional detail above. According to one embodiment, the pusher 10, 150 will only move forward—but not backward—in the wireless mode. Alternatively, the pusher 10, 150 can move forward and backward in wireless mode. In one exemplary implementation, it is understood that the guide handle 26 can be used in those circumstances in which the pusher 10, 150 is coupled to multiple carts, as shown in FIG. 10O. In this situation, according to certain embodiments, the user couples the guide handle 26 to the cart 184 in the distal-most position of the line of carts as shown in the figure using the same or similar steps to those set forth above for coupling to the bar 186. Regardless of where the guide handle 26 is coupled, when the user has completed the desired task with the pusher 10, 150 in the wireless mode, the user can return the pusher 10, 150 to its original status by removing the guide handle 26 and placing it in its base position (as shown in FIG. 1, for example) by reversing the steps described above for coupling the handle 26 to the cart (such as cart 180 or cart 184). Then the user can shut down the remote unit 60, place it back in the remote unit receptacle 61, and turn the actuation key 66 to the off mode position.

As discussed above, the various power pusher implementations disclosed and contemplated herein can be configured to be interchangeably coupleable to a number of different carts and other wheeled devices. For example, according to another embodiment as shown in FIGS. 11A and 11B, a power pusher 500 can be configured to be coupleable to a shelf cart such as the shelf cart 502.

Figure 11A:
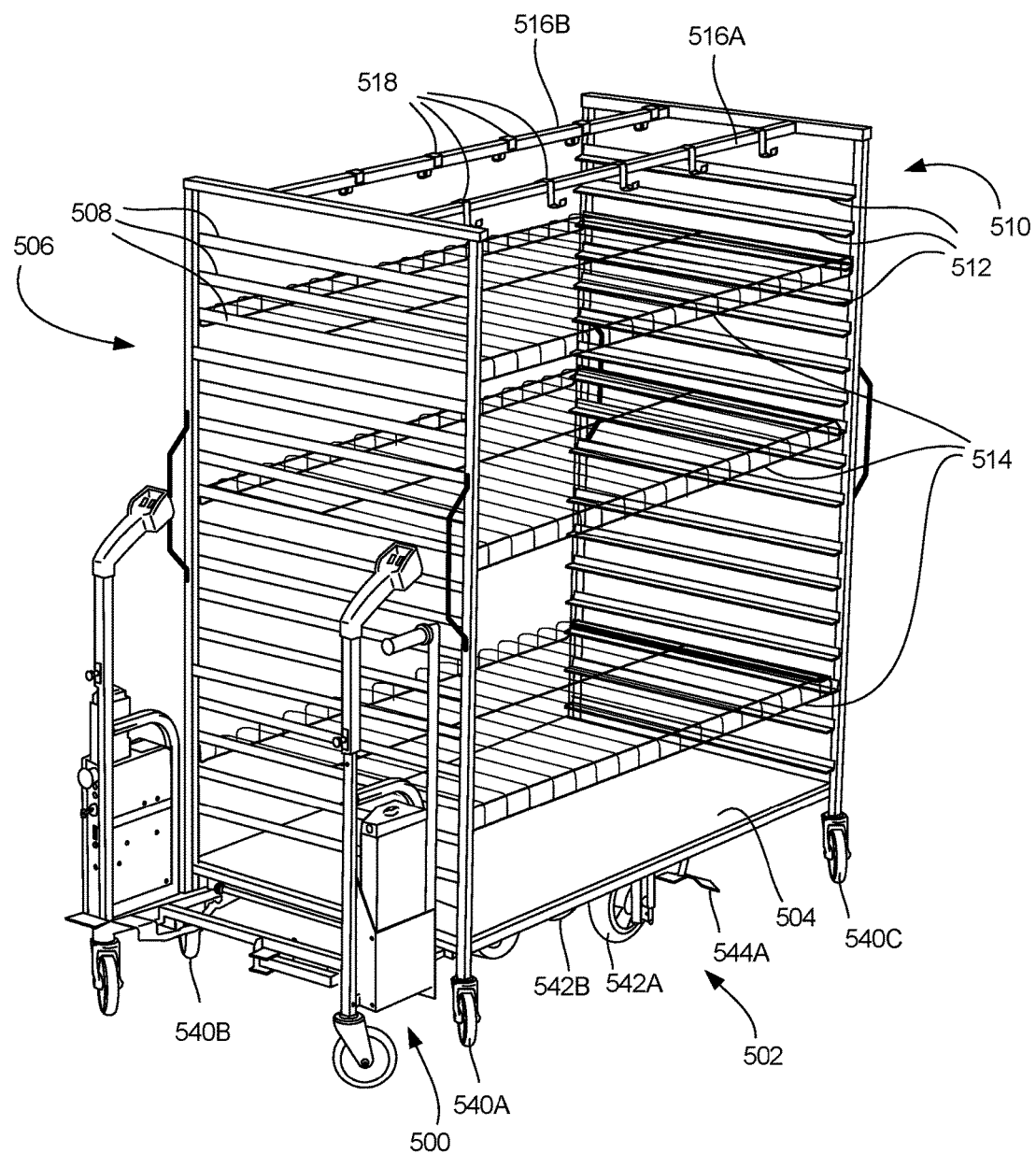
FIG. 11A is a rear perspective view of a pusher coupled to a shelf cart, according to one embodiment.
Figure 11B:
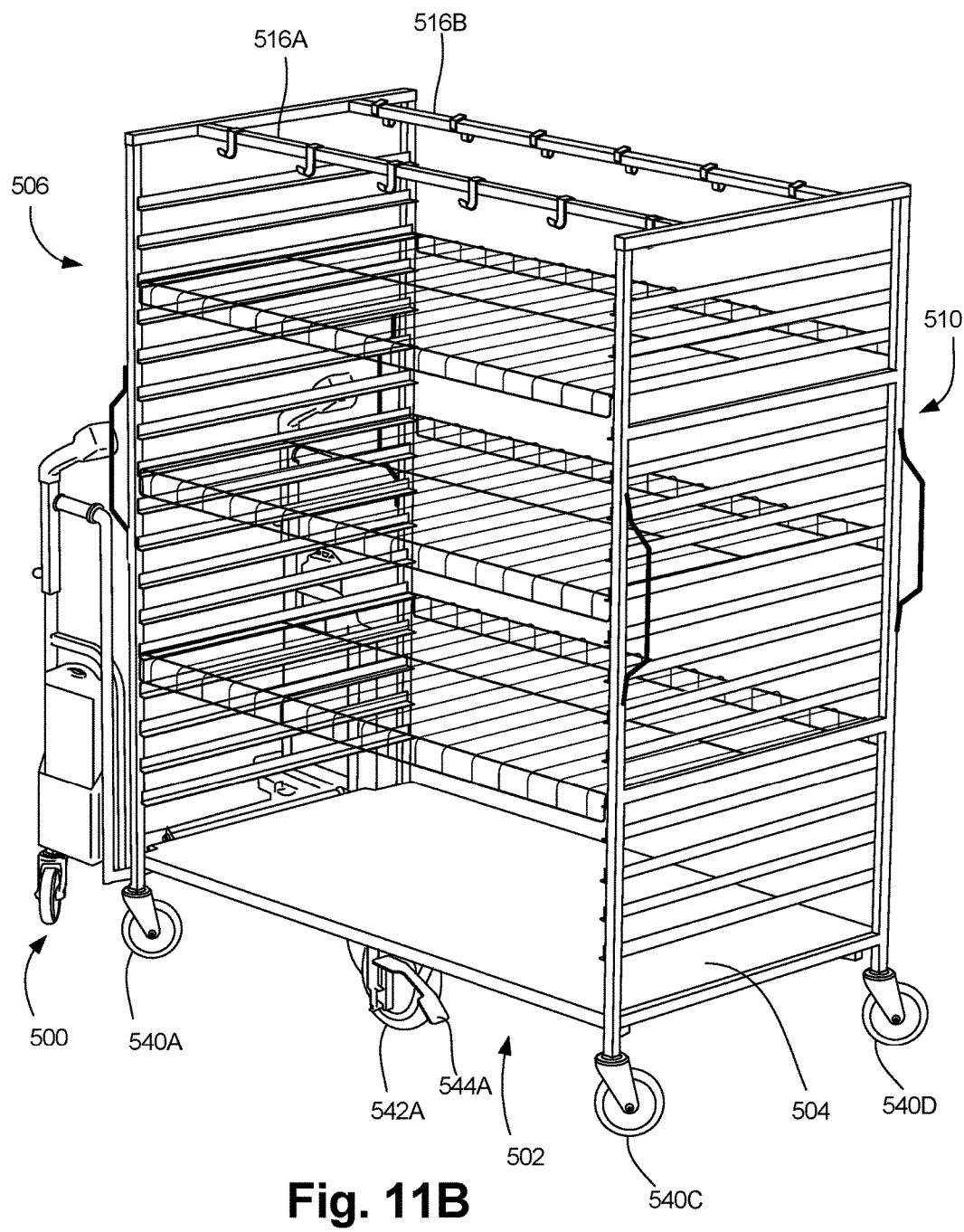
FIG. 11B is a front perspective view of the pusher coupled to the shelf cart of FIG. 11A, according to one embodiment.
Figure 12A:
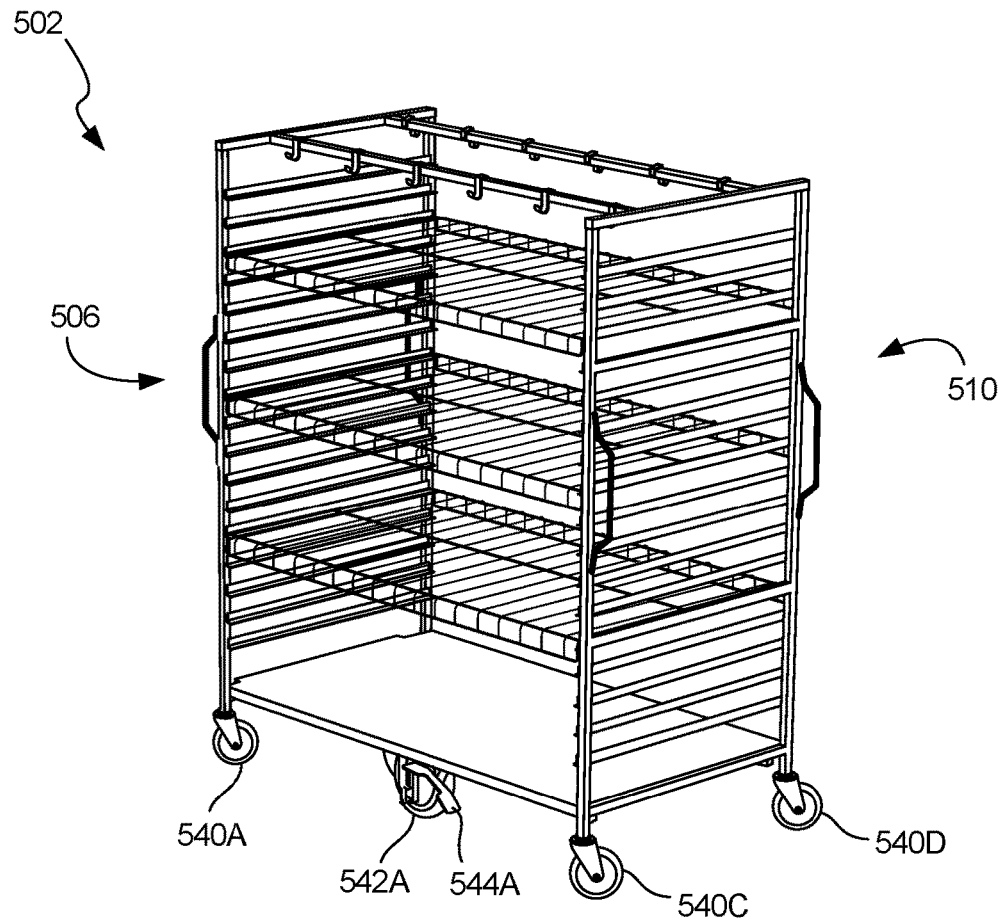
FIG. 12A is a perspective view of a shelf cart, according to one embodiment.
Figure 12B:
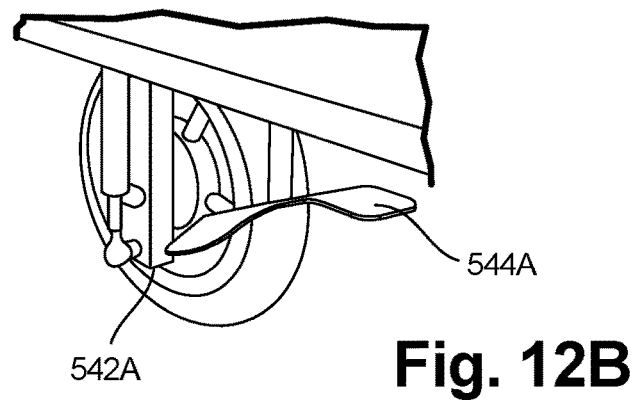
FIG. 12B is a close-up perspective view of a portion of the shelf cart of FIG. 12A, according to one embodiment.

In FIGS. 11A and 11B, the pusher 500 is coupled to the shelf cart 502, which is also depicted in FIGS. 12A and 12B (without the pusher 500 coupled thereto). The cart 502 has a base 504, a first end frame 506 having horizontal bars 508, and a second end frame 510 having horizontal bars 512. In this embodiment, the cart 502 has three removable shelves 514 removably coupled at each end to the appropriate horizontal bars 508, 512. It is understood that each of the shelves 514 can be moved from its current position and placed at any vertical position by coupling each end of the shelf 514 to the appropriate horizontal bars 508, 512 on the end frames 506, 510. It is further understood that any number of shelves 514 can be removably coupled to the cart 502, ranging from no shelves or one shelf 514 to as many shelves as there are corresponding horizontal bars 508, 512. The cart 502 also has two support bars 516A, 516B extending along the length of the cart 502 and coupled at each end to the first and second end frames 506, 510. According to one implementation, the support bars 516A, 516B have clips 518 or other known devices or components coupled along their lengths that can be used to hang items therefrom.

In addition, the cart 502 has four outer wheels 540A, 540B, 540C, 540D. In one embodiment, all four of the outer wheels 540A, 540B, 540C, 540D are swivel wheels that each can turn 360 degrees on its swivel. Further, the cart 502 has two central guidance wheels 542A, 542B positioned centrally under the base 504. In this exemplary implementation, the central guidance wheels 542A, 542B do not swivel, but instead are fixed. Further, the guidance wheels 542A, 542B can be moved between a retracted (also referred to as "non-deployed" or "raised") position (as best shown in FIG. 12A) in which the wheels 542A, 542B are not in contact with the floor or ground on which the cart 502 is resting and a deployed (or "lowered") position (as best shown in FIG. 12B) in which the wheels 542A, 542B have been lowered such that the wheels 542A, 542B are in contact with the floor or ground on which the cart 502 is resting. Note that there is a deployment lever 544A that is actuated by the user to move the wheels 542A, 542B between the non-deployed and deployed positions, which will be described in further detail below. In this embodiment, the cart 502 has only one deployment lever 544A. Alternatively, as will be described in additional detail below, there can be two deployment levers.

In use, the cart 502 can be pushed from one location to another manually by a user. In one embodiment, the user first actuates the deployment lever 544A to move the central guidance wheels 542A, 542B into the deployed position, thereby allowing a user to urge the cart 502 from one place to another with ease and stability due to the deployment of the central guidance wheels 542A, 542B. The inability of the central guidance wheels 542A, 542B to swivel means that when the central guidance wheels 542A, 542B are in the deployed position, the cart 502 can be urged forward in a fairly straight line without much effort by the user. In contrast, without the central guidance wheels 542A, 542B deployed, the swivel wheels 540A, 540B, 540C, 540D freely swivel during use and thus can potentially cause the cart 502 to easily veer in an undesirable direction or even cause both ends of the cart 502 to veer in different directions. On the other hand, if the user needs to move the cart 502 sideways, the user can use the deployment lever 544A to move the central guidance wheels 542A, 542B into the non-deployed position, thereby allowing the user to push the cart 502 sideways or any other direction other than a fairly straight line.

When the cart 502 is to be pushed using the power pusher 500, the pusher 500 is coupled to the cart 502 as best shown in FIGS. 11A and 11B. According to one embodiment, when the pusher 500 is coupled to the cart 502, the central guidance wheels 542A, 542B are automatically actuated to move into the non-deployed position. This automatic actuation will be described in further detail below. Alternatively, the lever 544A can be used to actuate the manual retraction of the wheels 542A, 542B. It is understood that the central guidance wheels 542A, 542B are moved into the non-deployed position in this implementation because the wheels 542A, 542B in the deployed position would cause difficulties for operation of the pusher 500 when it is coupled to the cart 502. That is, the deployed non-swiveling central guidance wheels 542A, 542B in combination with the fixed front wheels of the pusher 500 (similar to the fixed front wheels 18A, 18B described above with respect to the pusher 10) would make it difficult to make any turns using the pusher 500 coupled to the cart 502.

Figure 13A:
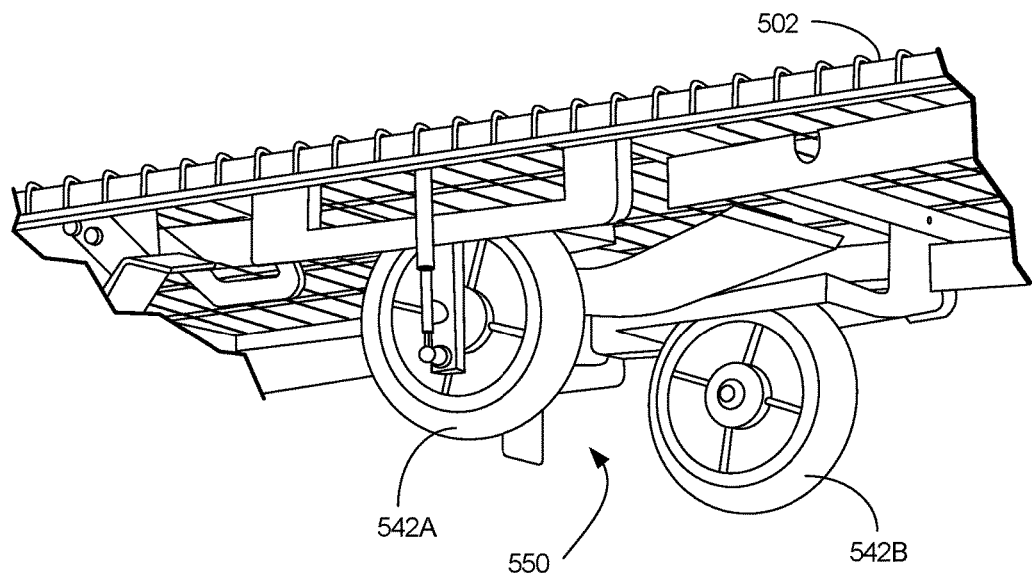
FIG. 13A is a lower perspective view of a wheel assembly coupled to the underside of a cart, according to one embodiment.
Figure 13B:
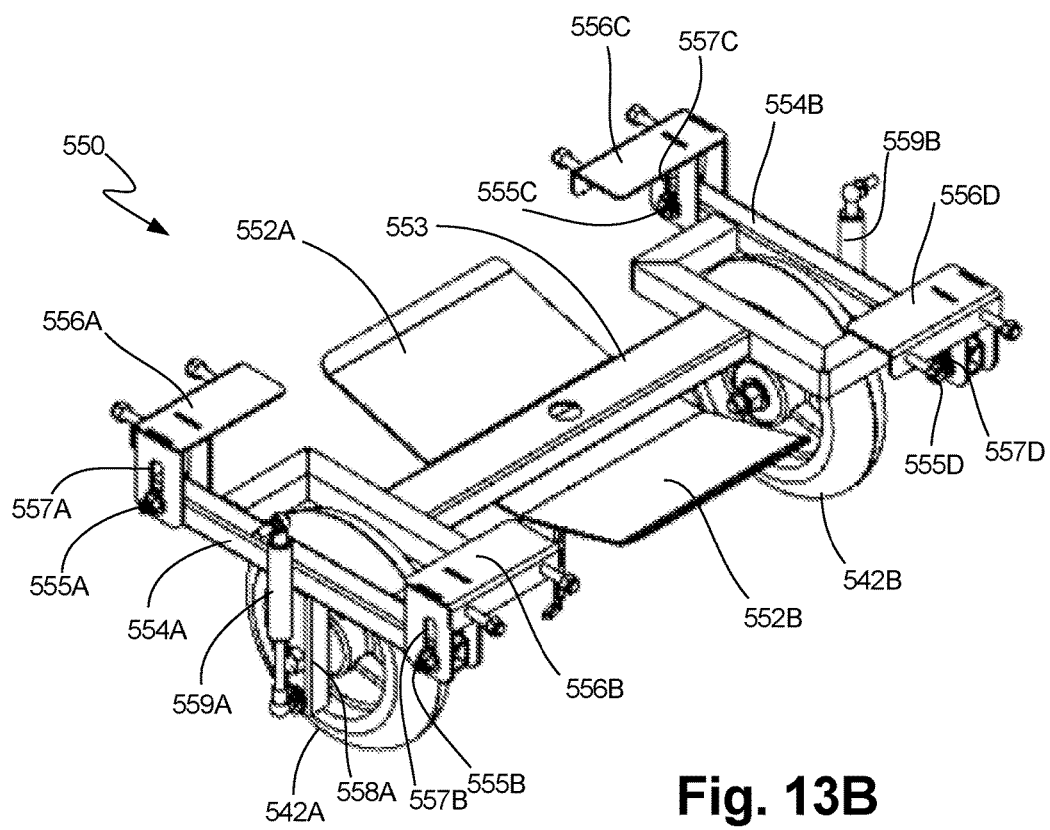
FIG. 13B is an upper perspective view of the wheel assembly of FIG. 13A, according to one embodiment.
Figure 13C:
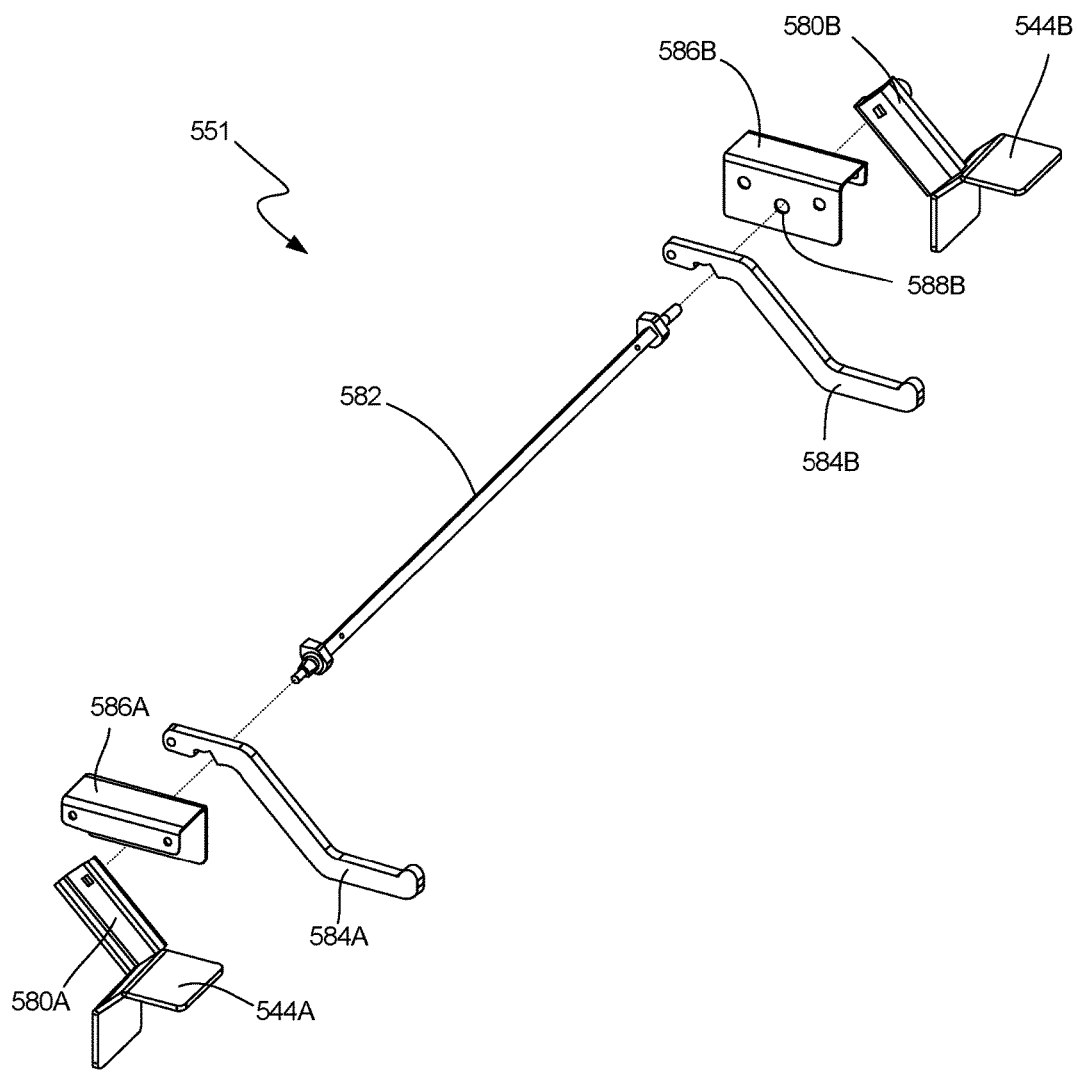
FIG. 13C is an exploded view of a portion of the wheel assembly of FIG. 13A, according to one embodiment.

The deployable central guidance wheels 542A, 542B and the associated guide wheel assembly 550 are depicted in additional detail in FIGS. 13A-13C, according to one embodiment. As discussed above, the central guidance wheels 542A, 542B can be moved between the deployed and retracted positions manually using the deployment lever 544A or automatically when a pusher 500 is coupled to the cart (such as cart 502). FIG. 13A is a depiction of the guide wheel assembly 550 coupled to the underside of a cart (such as cart 502 discussed above) according to one implementation, while FIG. 13B depicts a top perspective view of the assembly 550 without the cart. FIG. 13C depicts the manual deployment assembly 551, according to one embodiment.

As best shown in FIG. 13B, the guide wheel assembly 550 has automatic deployment plates 552A, 552B coupled to the assembly frame 553. The frame 553 has outer bars 554A, 554B, both of which have two slot bolts or pins 555A, 555B, 555C, 555D protruding from the outer bars 554A, 554B near the ends of those bars 554A, 554B. As shown in the figure, the bolts 555A, 555B, 555C, 555D are configured to be slidably positioned in the slots 557A, 557B, 557C, 557D of the cart brackets 556A, 556B, 556C, 556D that are fixedly attached to the cart (such as cart 502). The outer bars 554A, 554B are also coupled to the wheels 542A, 542B via the vertical bars 558A, 558B (only 558A is visible in FIG. 13B because of the perspective of the figure). The assembly 550 also has two tensioned components 559A, 559B that are coupled at the top of the components 559A, 559B to the cart 502 and at the bottom to the vertical bars 558A, 558B. In one embodiment, the tensioned components 559A, 559B are gas springs 559A, 559B. Alternatively, the tensioned components 559A, 559B can be any springs or other tensioned components configured to apply a steady force. The tensioned components 559A, 559B are tensioned to urge the vertical bars 558A, 558B and thus the entire wheel assembly 550 downward.

In use, the guide wheel assembly 550 provides for automatic retraction of the wheels 542A, 542B when a pusher 550 is coupled to the cart 502. That is, as the pusher 550 is advanced toward the cart 502 such that the base (like base 12 on pusher 10) is positioned underneath the cart 502, the pusher 550 makes contact with one of the automatic deployment plates 552A, 552B as the pusher 550 is coupling to the cart 502. Note that the guide wheel assembly 550 is configured such that the automatic retraction of the wheels 542A, 542B will be triggered by the pusher 550 being coupled to either end of the cart 502. That is, the pusher 550 can couple to either end of the cart 502 and still trigger automatic retraction of the wheels 542A, 542B because the assembly 550 has two deployment plates 552A, 552B. If the pusher 550 is coupled to the end of the cart 502 toward which the plate 552A is positioned, then the pusher 550 will make contact with that plate 552A and cause retraction. Alternatively, if the pusher 550 is coupled to the end of the cart 502 toward which the plate 552B is positioned, then the pusher 550 will make contact with that plate 552B and cause retraction.

The automatic retraction of the wheels 542A, 542B works in the following fashion, according to one embodiment. The tensioned components 559A, 559B ensure that the assembly 550 and thus the wheels 542A, 542B are continuously urged downward toward the floor or ground beneath the cart 502. When the pusher 550 is coupled to the cart 502, the pusher 550 contacts the appropriate plate 552A, 552B. Each plate 552A, 552B is disposed at an angle as shown in FIG. 13B such that the contact end of each plate 552A, 552B (the end of each plate 552A, 552B opposite the end coupled to the frame 553) is disposed at a position that is higher (farther away from the floor or ground) in comparison to the end coupled to the frame 553. This sloped or angled configuration of the plates 552A, 552B facilitates contact with the pusher 550 by helping to ensure that the pusher 550 contacts the underside of the plate 552A, 552B at or near the contact end of the plate 552A, 552B. Further, the angled configuration causes either plate 552A, 552B to move upward as the pusher 550 continues to be urged against the plate 552A, 552B.

Thus, if the pusher 550 is coupled to the cart 502 such that the pusher 550 contacts the plate 552A, the plate 552A is urged upward as the pusher 550 continues to be moved distally. This causes the assembly 550 to be urged upward on the side of the assembly 550 having the base plate 552A. The upward force caused by the pusher 550 is sufficient to overcome the downward force applied by the tensioned components 559A, 559B, thereby allowing the assembly 550 to move upward. This causes the outer bars 554A, 554B to move upward. In one embodiment, the ends of the bars 554A, 554B on the same side of the frame 553 as the plate 552A will move upward further than the opposite ends of those bars 554A, 554B. As the outer bars 554A, 554B move upward, the bolts 555A, 555B, 555C, 555D slide upward in the slots 557A, 557B, 557C, 557D. Further, as the outer bars 554A, 554B move upward, the vertical bars 558A, 558B move upward, thereby raising the wheels 542A, 542B as well. Thus, the end result is that the wheels 542A, 542B are urged into the retracted position such that the wheels 542A, 542B are not in contact with the ground or floor beneath the cart 502.

As best shown in FIG. 13C, the manual deployment assembly 551 has two deployment levers (also referred to as "pedals") 544A, 544B—one at each end of the assembly 551. The assembly 551 can be positioned under any cart disclosed herein (such as cart 502) in combination with the wheel assembly 550 discussed above such that the pedals 544A, 544B are positioned on opposite sides of the cart 502 along the side of the cart 502 like the pedal 544A depicted in FIG. 12A. The pedal 544A is coupled to a lever arm 580A that is fixedly coupled to an assembly rod 582 such that actuation of the pedal 544A causes rotation of the rod 582. Similarly, the pedal 544B is coupled to a lever arm 580B that is also fixedly coupled to the assembly rod 582. Both lever arms 580A, 580B are coupled to the rod 582 through an opening 588A, 588B (only 588B is depicted in FIG. 13C because of the perspective) in a hinge 586A, 586B that is fixedly coupled to the cart 502, with the arms 580A, 580B and the rod 582 being rotatable in relation to the hinges 586A, 586B. The assembly rod 582 is fixedly coupled to two arms 584A, 584B such that rotation of the rod 582 causes the arms 584A, 584B to move between a raised position and a lowered position. The two arms 584A, 584B are coupled to the wheel assembly 550 such that moving the arms 584A, 584B into the raised position will raise the wheel assembly 550 such that the wheels 542A, 542B move into the retracted position, while moving the arms 584A, 584B into the lowered position will lower the wheel assembly 550 such that the wheels 542A, 542B move into the deployed position. Alternatively, the assembly 551 can have any combination of components that will provide for raising and lower the wheel assembly 550.

In use, the manual deployment assembly 551 provides for manual retraction and deployment of the wheels 542A, 542B by providing for the deployment levers 544A, 544B that can be actuated by a user. That is, if a user wants to manually push the cart 502 from one location to another with the guide wheels 542A, 542B in the deployed position and the wheel assembly 550 is currently in the retracted position, the user can depress one of the levers 544A, 544B to cause the arms 584A, 584B to move into the lowered position, thereby causing the wheel assembly 550 to move into the deployed position. Alternatively, if the user wants to manually push the cart 502 sideways or in another direction other than a substantially straight line parallel to the length of the cart 502 and the wheel assembly 550 is currently in the deployed position, the user can depress one of the levers 544A, 544B to cause the arms 584A, 584B to move into the raised position, thereby causing the wheel assembly 550 to move into the retracted position.

It is understood that the wheels 542A, 542B, wheel assembly 550, and manual deployment assembly 551 can be incorporated into any of the cart embodiments disclosed or contemplated herein.

Figure 14A:
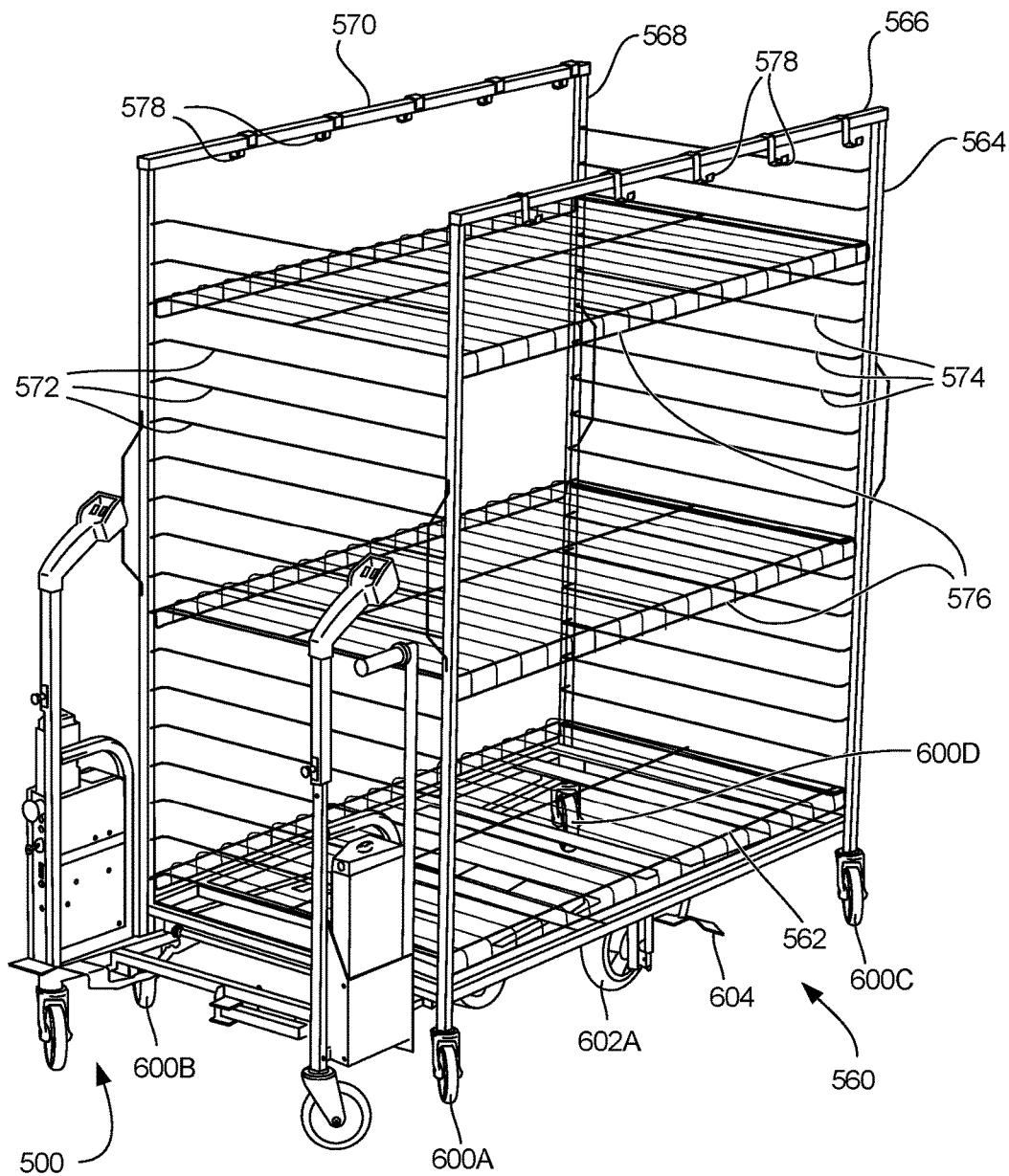
FIG. 14A is a rear perspective view of a pusher coupled to a shelf cart, according to another embodiment.
Figure 14B:
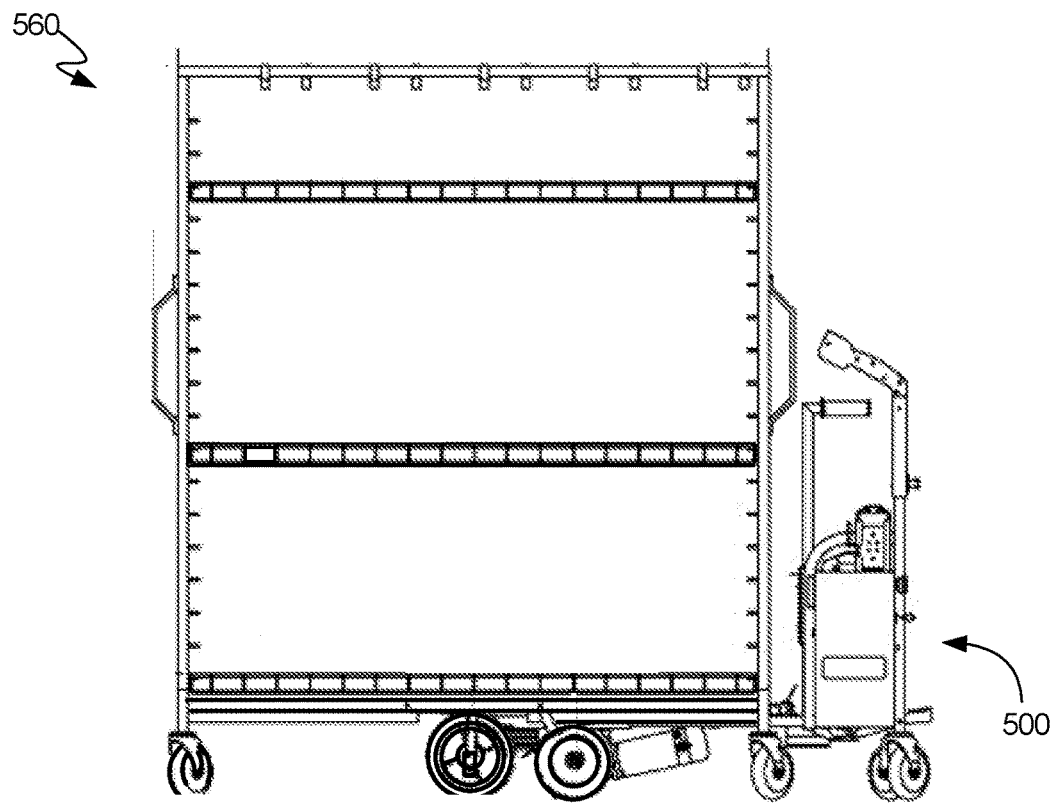
FIG. 14B is a side view of the pusher coupled to the shelf cart of FIG. 14A, according to one embodiment.
Figure 14C:
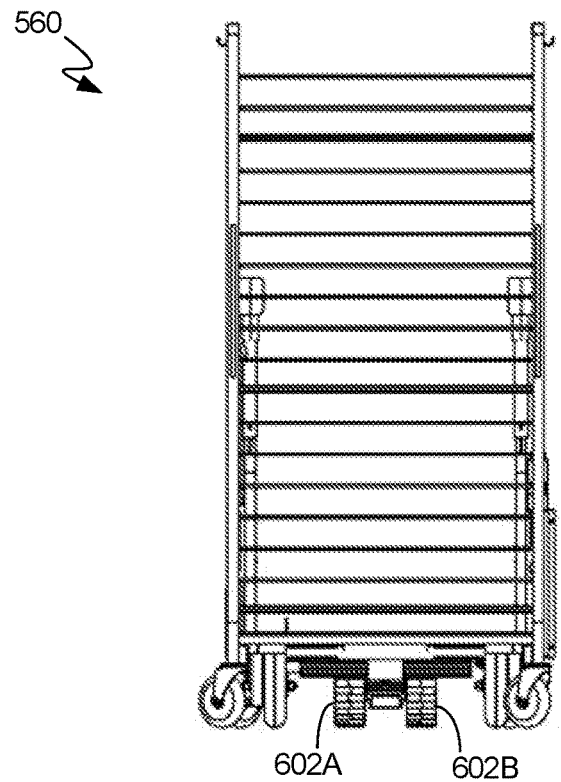
FIG. 14C is a front view of the pusher coupled to the shelf cart of FIG. 14A, according to one embodiment.

Another embodiment of a shelf cart 560 is depicted in FIGS. 14A, 14B, and 14C. In this embodiment, the pusher 500 is coupled to the shelf cart 560. Like the previous shelf cart embodiment, this cart 560 has a base 562. Unlike the previous implementation, the cart 560 has a first side frame 564 with a first support bar 566 and a second side frame 568 with a second support bar 570. In addition, the cart 560 has first and second sets of horizontal bars 572, 574, wherein each of the bars of each set 572, 574 is coupled at one end to the first side frame 564 and at the other end to the second side frame 568. In this embodiment, the cart 560 has two removable shelves 576 removably coupled at each end to the appropriate horizontal bars 572, 574. It is understood that each of the shelves 576 can be moved from its current position and placed at any vertical position by coupling each end of the shelf 576 to the appropriate horizontal bars 572, 574. It is further understood that any number of shelves 576 can be removably coupled to the cart 560, ranging from no shelves or one shelf 576 to as many shelves as there are corresponding horizontal bars 572, 574. According to one implementation, the support bars 566, 570 have clips 578 or other known devices or components coupled along their lengths that can be used to hang items therefrom.

In addition, the cart 560 has four outer wheels 600A, 600B, 600C, 600D. In one embodiment, all four of the outer wheels 600A, 600B, 600C, 600D are swivel wheels that each can turn 360 degrees on its swivel. Further, the cart 560 has two central guidance wheels 602A, 602B positioned centrally under the base 562. In this exemplary implementation, the central guidance wheels 602A, 602B do not swivel. Further, the guidance wheels 602A, 602B can be moved between a non-deployed position and a deployed position in a fashion similar to that described above with respect to the cart 502. Note that there is a deployment lever 604 that is actuated by the user to move the wheels 602A, 602B between the non-deployed and deployed positions.

Figure 15:
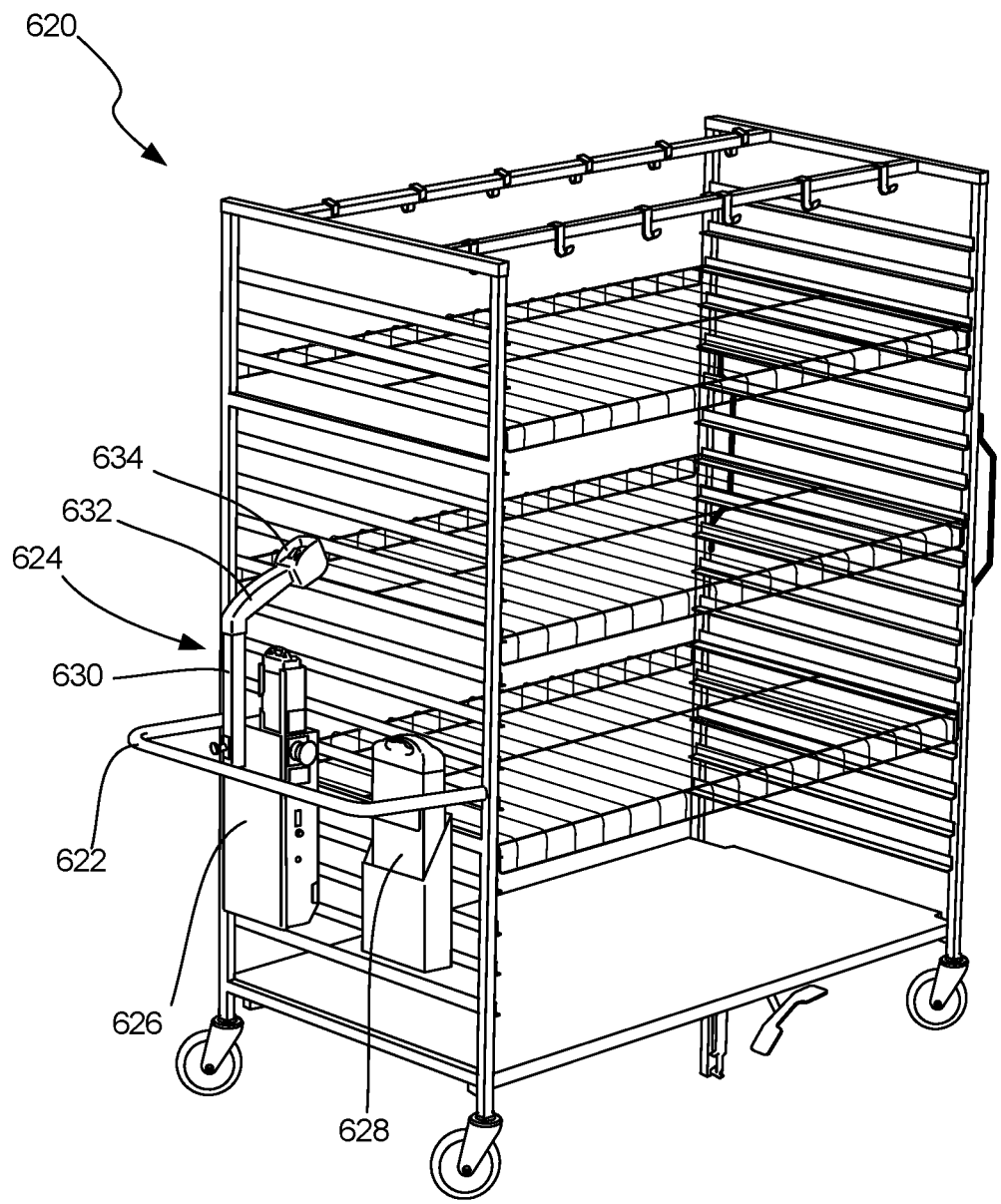
FIG. 15 is a rear perspective view of a self-propelled shelf cart, according to one embodiment.
Figure 16A:
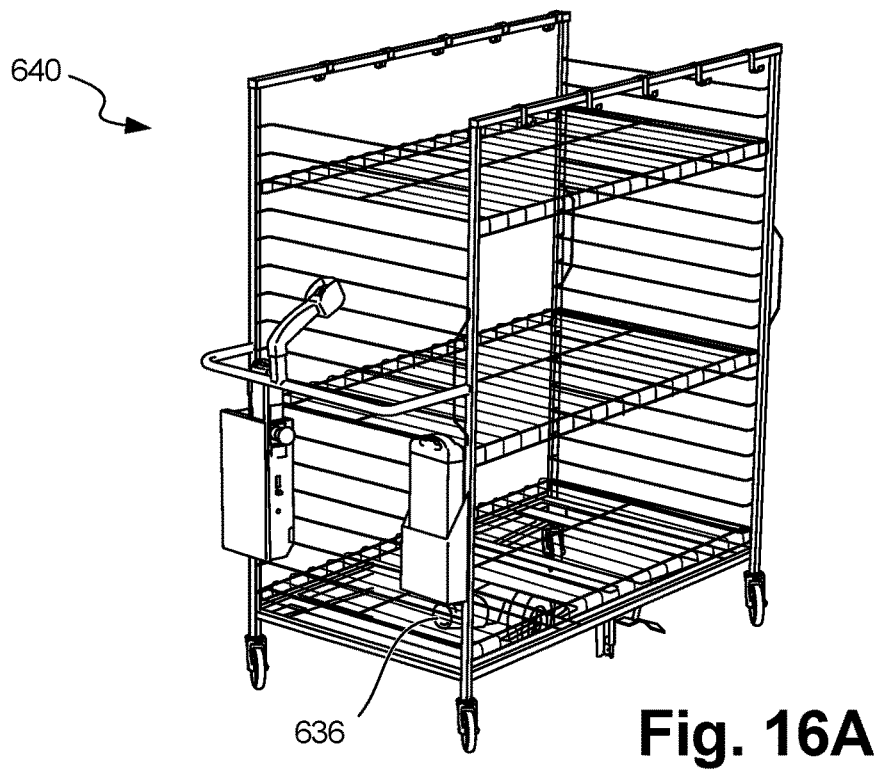
FIG. 16A is a rear perspective view of a self-propelled shelf cart, according to another embodiment.
Figure 16B:
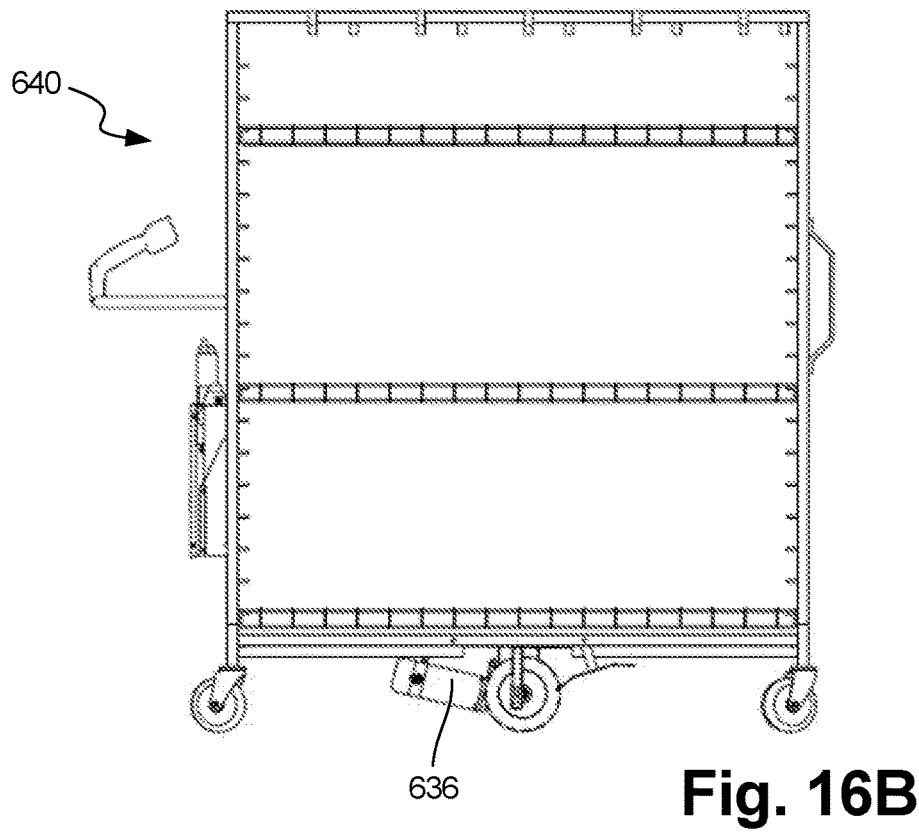
FIG. 16B is a side view of the self-propelled shelf cart of FIG. 16A, according to one embodiment.

One embodiment of a self-powered shelf cart 620 is depicted in FIG. 15, and another implementation of a self-powered shelf cart 640 is depicted in FIGS. 16A and 16B. In these embodiments, no pusher is required, because the cart embodiments 620, 640 are self-propelled. In addition to various components similar to those described above with respect to carts 502 and 560, the shelf cart 620, 640 implementations have a push bar 622, a control handle 624 coupled to the push bar 622, a controller 626, and a battery 628. It is understood that the controller 626 can be similar to the controller 22 described above and have similar components as well. The control handle 624 has a handle support 630, a grip 632, and a throttle 634. The cart 620 has a motor (not shown) that is similar to the motor 636 on the cart 640, as best shown in FIGS. 16A and 16B.

Figure 17:
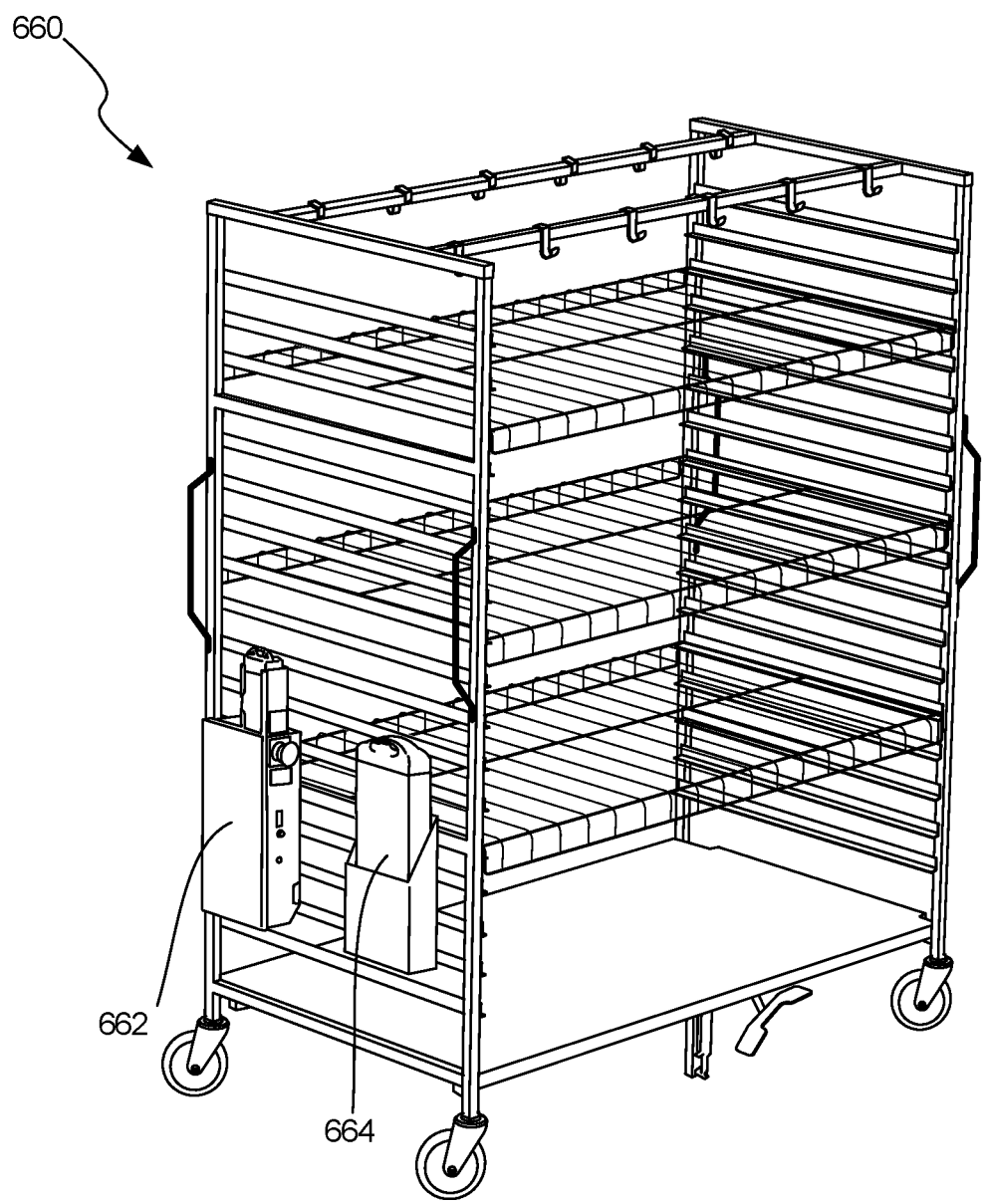
FIG. 17 is a rear perspective view of a self-propelled shelf cart, according to a further embodiment.
Figure 18A:
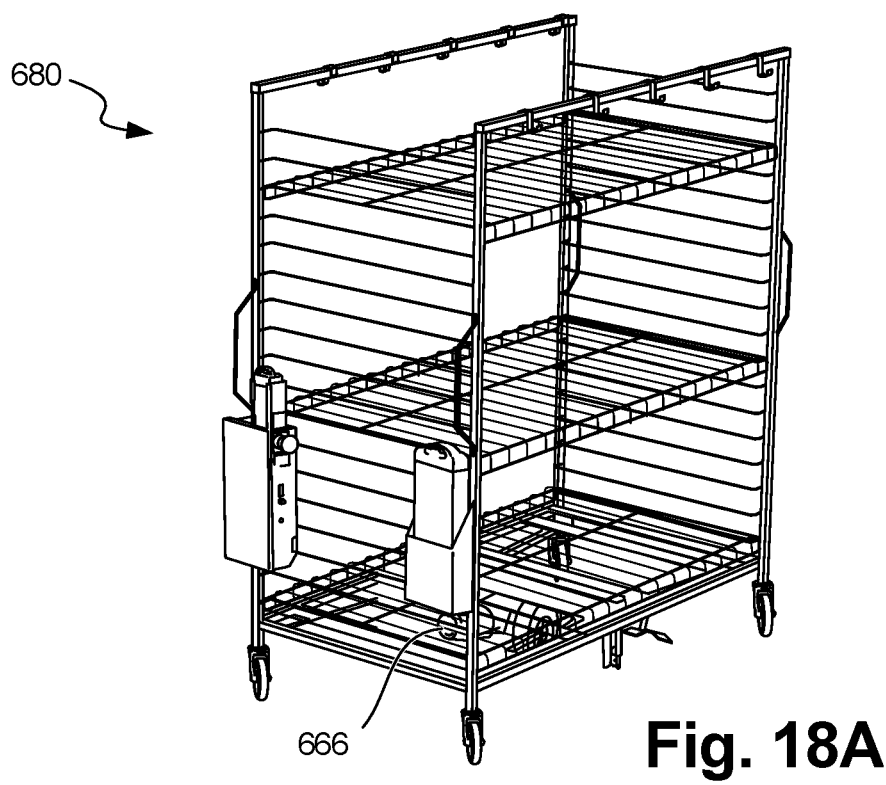
FIG. 18A is a rear perspective view of a self-propelled shelf cart, according to yet another embodiment.
Figure 18B:
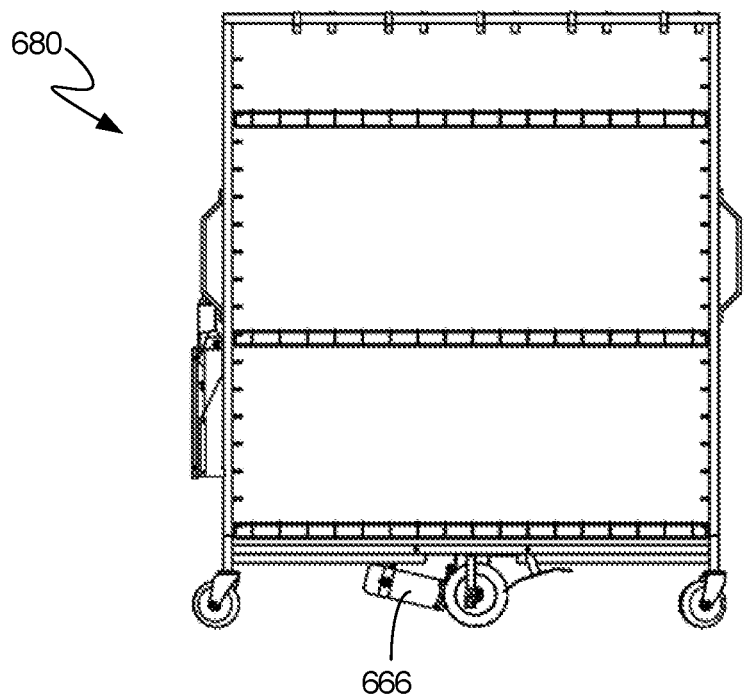
FIG. 18B is a side view of the self-propelled shelf cart of FIG. 18A, according to one embodiment.

Alternatively, certain carts can be self-propelled and wirelessly controlled. For example, one embodiment of a self-powered, wirelessly-controlled shelf cart 660 is depicted in FIG. 17, and another implementation of a self-powered, wirelessly-controlled shelf cart 680 is depicted in FIGS. 18A and 18B. In these embodiments, no pusher is required, because the cart embodiments 660, 680 are self-propelled, and no control handle is required, because the cart embodiments 660, 680 are controlled with a wireless controller (not shown) that is not physically coupled to the cart 660, 680. In addition to various components similar to those described above with respect to carts 502, 560, the shelf cart 660, 680 implementations have a controller 662 and a battery 664. It is understood that the controller 662 can be similar to the controllers 22, 626 described above and have similar components as well. In addition, the controller 662 has a wireless transceiver (not shown) that is configured to communicate with the wireless controller (not shown). The cart 660 has a motor (not shown) that is similar to the motor 666 on the cart 680, as best shown in FIGS. 18A and 18B.

Figure 19A:
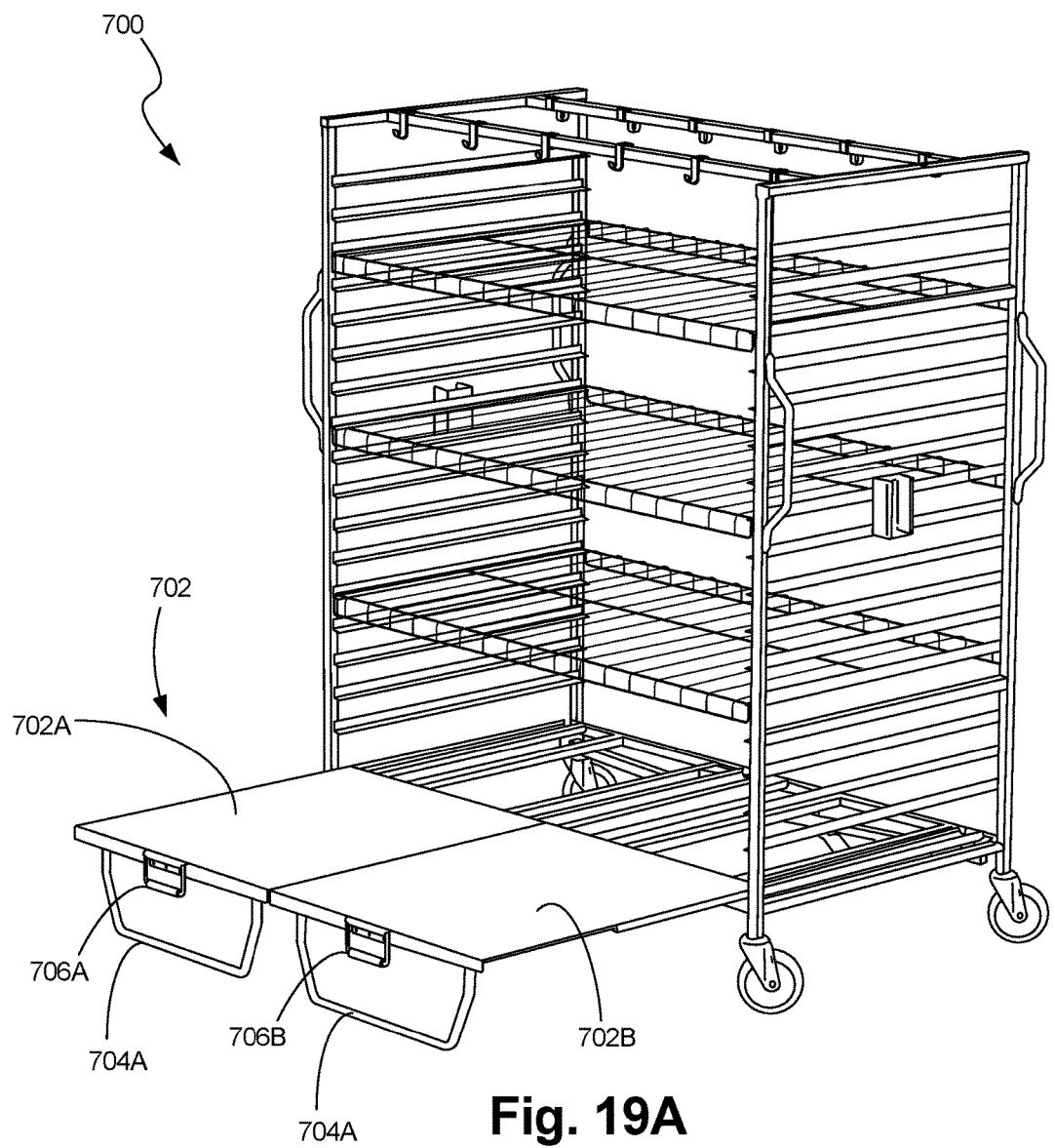
FIG. 19A is a perspective view of a shelf cart with two platform sections deployed, according to one embodiment.
Figure 19B:
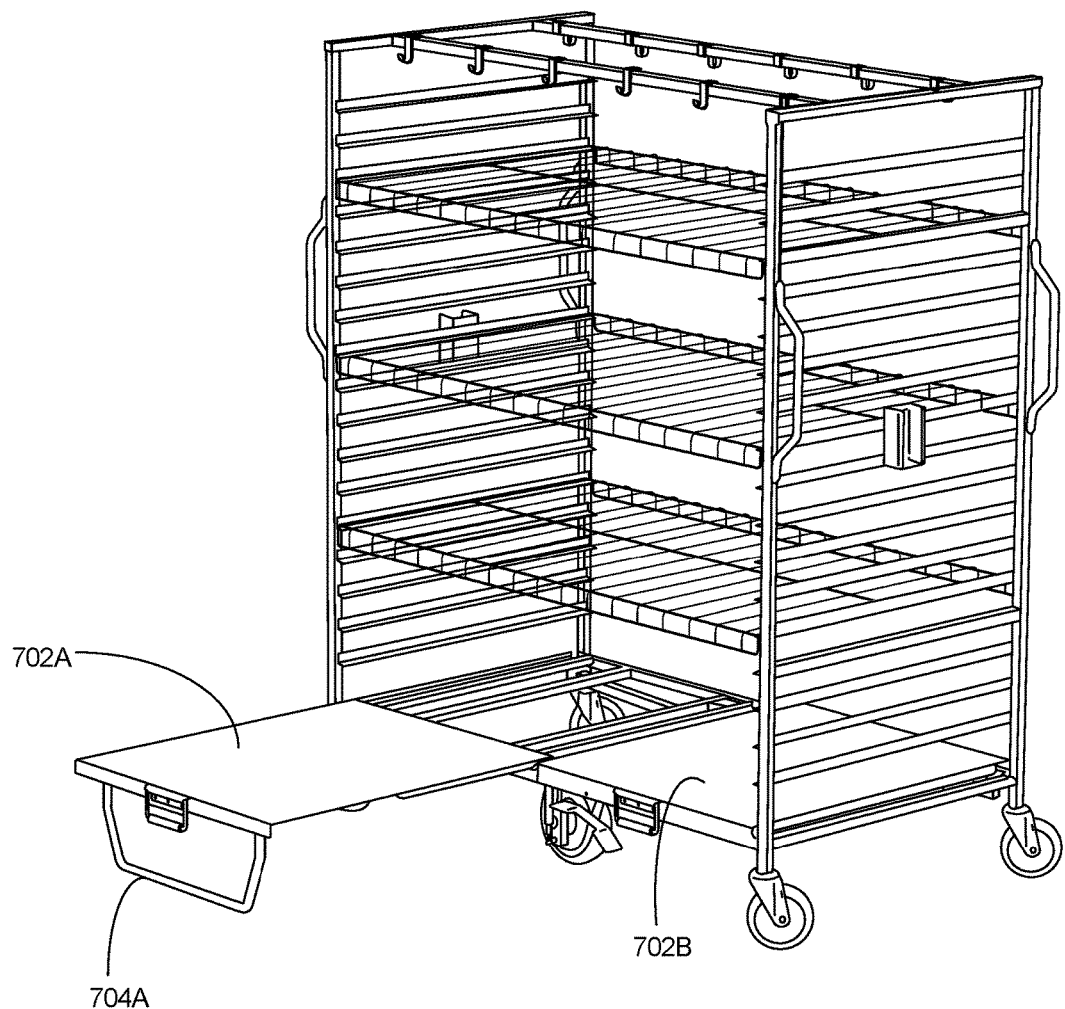
FIG. 19B is a perspective view of the shelf cart of FIG. 19A with one platform section deployed and the other retracted, according to one embodiment.

In accordance with one embodiment, any of the shelf cart implementations disclosed or contemplated herein (including shelf carts 502, 560, 620, 640, 660, and 680) can also include an extendable/retractable shelf platform 702, as shown in the shelf cart embodiment 700 depicted in FIGS. 19A and 19B. The platform 702 is integrated into the cart 700 and configured to be extendable out of the cart 700 and retractable back into the shelf cart 700. In the embodiment as shown, the platform 702 is actually made up of two platform sections 702A, 702B, both of which are independently extendable and retractable as shown in the figures. Alternatively, the platform can incorporated into the shelf or extendably positioned directly underneath the shelf. In a further alternative, the platform can be positioned in or incorporated into the cart 700 in any fashion that allows for the platform to extend outward from the cart 700 in a fashion similar to that shown.

In this embodiment, each platform section 702A, 702B has an extendable leg 704A, 704B that extends down from the section 702A, 702B when the section 702A, 702B is deployed, thereby supporting the section 702A, 702B when it is carrying the weight of any item added and preventing the cart 700 from tipping over under the weight of the item. Each leg 704A, 704B is then moved back into a retracted position beneath or against the underside of the sections 702A, 702B prior to retracting the sections 702A, 702B back into their retracted positions on the cart 700.

Further, each section 702A, 702B also has a handle 706A, 706B coupled to the outer edge of the section 702A, 702B that can be used by the user to more easily extend and retract the section 702A, 702B. More specifically, the user can grasp the appropriate handle 706A, 706B to either extend or retract the appropriate section 702A, 702B.

In use, the platform 702 can be used to position items, including, for example, heavy items or larger boxed items, onto a relatively inaccessible shelf, thereby reducing the amount of physical exertion and risk of injury for the user. That is, rather than a user trying to position an item onto such an inaccessible shelf, the user can actuate the extendable/retractable shelf platform 702 (or in this case, either or both of the sections 702A, 702B) to move into its extended position as shown in FIGS. 19A and 19B. Once the platform 702 (or one section 702A, 702B) is extended, the user can easily place the item on the platform 702 or either section 702A, 702B. Once the item is placed as desired, the platform section 702A, 702B (or both) can be moved back into its retracted position, thereby moving the item into position in the cart 700.

Alternatively, the platform can extend from the shelf and both the platform and shelf can have rollers (not shown) positioned strategically thereon such that once the user places the item on the platform, the user can easily urge the item into position on the shelf over the rollers (not shown).

Figure 20:
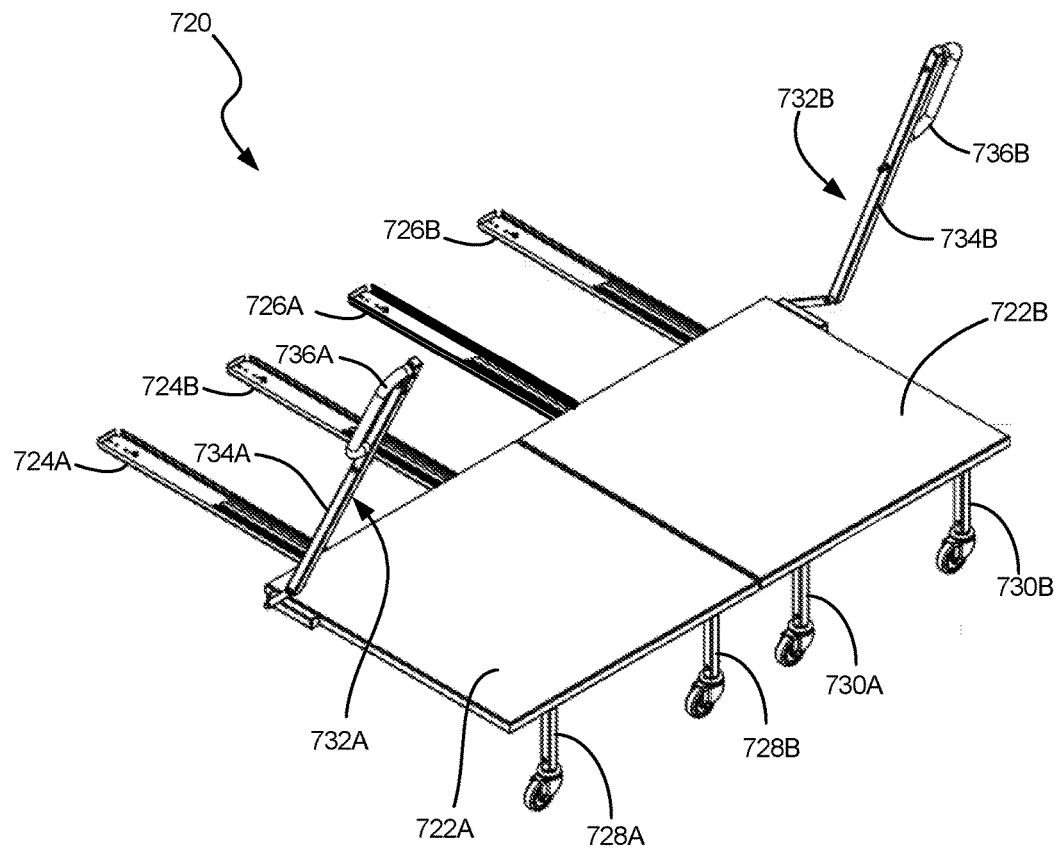
FIG. 20 is a perspective view of two platform sections for a shelf cart, according to another embodiment.

An alternative embodiment of an extendable/retractable shelf platform 720 is depicted in FIG. 20. This embodiment can also be used with any of the shelf cart implementations disclosed or contemplated herein. This platform 720 has two platform sections 722A, 722B, both of which are independently extendable and retractable along the appropriate platform rails 724A, 724B, 726A, 726B as shown in the figure. It is understood that the platform rails 724A, 724B, 726A, 726B are fixedly coupled to the shelf cart (such as the shelf cart 700 depicted in FIGS. 19A and 19B) such that the platform sections 722A, 722B can extend out of the cart (such as cart 700) and be retracted back into the cart on the rails 724A, 724B, 726A, 726B.

In this implementation, each platform section 722A, 722B has two extendable legs with wheels 728A, 728B, 730A, 730B. The wheeled legs 728A, 728B, 730A, 730B extend down from the section 722A, 722B when the section 722A, 722B is deployed, thereby supporting the section 722A, 722B when it is carrying the weight of any item added and preventing the cart (such as cart 700) from tipping over under the weight of the item. In one embodiment, the legs 728A, 728B, 730A, 730B are not retractable. Alternatively, each leg 728A, 728B, 730A, 730B is configured to moved between a retracted position and a deployed position. That is, each leg 728A, 728B, 730A, 730B is in retracted position against the appropriate section 722A, 722B when the section 722A, 722B is retracted. When the section 722A, 722B is deployed, the appropriate legs 728A, 728B, 730A, 730B extend to the deployed position such that the wheels of each of the legs 728A, 728B, 730A, 730B are contacting the ground or floor beneath the cart (such as cart 700). When the section 722A, 722B is retracted, the legs 728A, 728B, 730A, 730B are moved back to their retracted positions beneath or against the underside of the sections 722A, 722B.

The wheels on the legs 728A, 728B, 730A, 730B allow for moving the cart (such as cart 700) while one or both of the sections 722A, 722B are deployed. In addition, the wheels can make it easier to deploy or retract the sections 722A, 722B for use.

Further, each section 722A, 722B also has a handle 732A, 732B coupled to an edge of the section 722A, 722B that can be used by the user to more easily extend and retract the section 722A, 722B. More specifically, the user can grasp the appropriate handle 732A, 732B to either extend or retract the appropriate section 722A, 722B. In this embodiment, each handle 732A, 732B has a support 734A, 734B and a hand grip 736A, 736B positioned at an end of the handle. This configuration allows for the grips 736A, 736B to be more easily accessible by a user, reducing the need for the user to bend over to grasp the handles 732A, 732B.

Although the present invention has been described with reference to preferred embodiments, persons skilled in the art will recognize that changes may be made in form and detail without departing from the spirit and scope of the invention.

What is claimed is:

1. A powered pushing device, the device comprising:
   (a) a base;
   (b) a base bar defining an outer perimeter of the base;
   (c) a left control handle coupled to a left portion of the base bar;
   (d) a right control handle coupled to a right portion of the base bar;
   (e) a pair of rear swivel wheels;
   (f) a pair of front fixed wheels disposed under the base, wherein the fixed front wheels are disposed proximally from a front end of the base; and
   (g) a motor operably coupled to the pair of front fixed wheels,
   wherein a distance between the pair of rear swivel wheels is greater than a distance between the pair of front fixed wheels.

2. The powered pushing device of claim 1, wherein the base is a flatbed base.

3. The powered pushing device of claim 2, wherein the flatbed base has a maximum height of about 7.5 inches.

4. The powered pushing device of claim 1, wherein a distance between the left control handle and the right control handle is at least as great as a width of the base.

5. The powered pushing device of claim 4, wherein the left control handle and the right control handle define a space between the left and right control handles.

6. A powered pushing device, the device comprising:
   (a) a base;
   (b) a base bar defining an outer perimeter of the base;
   (c) a left control handle coupled to a left portion of the base bar;
   (d) a right control handle coupled to a right portion of the base bar;
   (e) a latching component configured to be coupleable to a wheeled object, wherein the latching component is disposed at a proximal location on the base;
   (f) a pair of rear swivel wheels;
   (g) a pair of front fixed wheels disposed under the base, wherein the fixed front wheels are disposed proximally from a front end of the base; and
   (h) a motor operably coupled to the pair of front fixed wheels.

7. The powered pushing device of claim 6, wherein the latching component is configured to be coupleable to a wheeled cart, a flatbed cart, a shelf cart, or a wheelchair.

8. The powered pushing device of claim 6, wherein the latching component comprises at least one latch, wherein the at least one latch is configured to be coupleable to a coupling component on the wheeled object.

9. The powered pushing device of claim 6, wherein the left control handle and the right control handle define an extended cargo space between the left and right control handles.

10. A powered pushing device, the device comprising:
    (a) a base;
    (b) a base bar defining an outer perimeter of the base;
    (c) a left control handle coupled to a left portion of the base bar;
    (d) a right control handle coupled to a right portion of the base bar;
    (e) an extended cargo space defined between the left and right control handles;
    (f) a latching component configured to be coupleable to a wheeled object, wherein the latching component is disposed at a proximal location on the base;
    (g) a pair of rear swivel wheels;
    (h) a pair of front fixed wheels disposed under the base, wherein the fixed front wheels are disposed proximally from a front end of the base; and
    (i) a motor operably coupled to the pair of front fixed wheels.

11. The powered pushing device of claim 10, wherein a distance between the pair of rear swivel wheels is greater than the distance between the pair of front fixed wheels.

12. The powered pushing device of claim 10, wherein the base is a flatbed base having a maximum height of about 7.5 inches.

13. The powered pushing device of claim 10, wherein the extended cargo space has a distance between the left control handle and the right control handle that is at least as great as a width of the base.

14. A powered pushing device, the device comprising:
    (a) a base;
    (b) a base bar defining an outer perimeter of the base;
    (c) a left control handle coupled to a left portion of the base bar;
    (d) a right control handle coupled to a right portion of the base bar;
    (e) an extended cargo space defined by a distance between the left and right control handles, wherein the distance is at least as great as a width of the base;
    (f) a latching component configured to be coupleable to a wheeled object, wherein the latching component is disposed at a proximal location on the base;
    (g) a pair of rear swivel wheels having a rear wheel distance between the pair of rear swivel wheels;
    (h) a pair of front fixed wheels disposed under the base, wherein the fixed front wheels are disposed proximally from a front end of the base, and further wherein the pair of front fixed wheels has a front wheel distance between the pair of front fixed wheels that is less than the rear wheel distance; and
    (i) a motor operably coupled to the pair of front fixed wheels.

15. The powered pushing device of claim 14, wherein the base is a flatbed base having a maximum height of about 7.5 inches.

16. The powered pushing device of claim 14, wherein the wheeled object comprises a wheeled cart, a flatbed cart, a shelf cart, or a wheelchair.

17. The powered pushing device of claim 14, wherein the latching component comprises at least one latch, wherein the at least one latch is configured to be coupleable to a coupling component on the wheeled object.

18. The powered pushing device of claim 14, wherein the latching component is configured to be interchangeably coupleable to a plurality of different wheeled objects.

19. The powered pushing device of claim 14, wherein the powered pushing device is coupleable to a shelf cart comprising a deployment plate and two guide wheels such that when the powered pushing device is positioned under the shelf cart, the powered pushing device makes contact with the deployment plate and causes the deployment plate to move, thereby causing the two guide wheels to move into a retracted position.

20. The powered pushing device of claim 14, wherein the powered pushing device is coupleable to at least two flatbed carts in a stacked configuration.

* * * * *